(12) United States Patent
Gade et al.

(10) Patent No.: US 11,329,690 B2
(45) Date of Patent: May 10, 2022

(54) NETWORK-ON-CHIP TOPOLOGY GENERATION

(71) Applicant: Arm Limited, Cambridge (GB)

(72) Inventors: Narayana Sri Harsha Gade, Bangalore (IN); Honnahuggi Harinath Venkata Naga Ambica Prasad, Bangalore (IN); Anup Gangwar, Austin, TX (US); Nitin Kumar Agarwal, Bangalore (IN); Ravishankar Sreedharan, Bangalore (IN)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/171,408

(22) Filed: Feb. 9, 2021

(65) Prior Publication Data

US 2021/0168038 A1 Jun. 3, 2021

Related U.S. Application Data

(63) Continuation-in-part of application No. 17/076,403, filed on Oct. 21, 2020, now Pat. No. 11,194,950, which is a continuation-in-part of application No. 16/518,254, filed on Jul. 22, 2019, now Pat. No. 10,817,627.

(51) Int. Cl.
*H04B 1/00* (2006.01)
*H04B 1/58* (2006.01)
*H04L 41/12* (2022.01)
*H04L 47/125* (2022.01)
*H04L 45/02* (2022.01)

(52) U.S. Cl.
CPC ............. *H04B 1/583* (2013.01); *H04L 41/12* (2013.01); *H04L 45/02* (2013.01); *H04L 47/125* (2013.01)

(58) Field of Classification Search
CPC ......... H04B 1/583; H04L 41/12; H04L 45/02; H04L 47/125; H04L 47/24; H04L 49/90; H04L 49/109; G06F 15/7825
See application file for complete search history.

(56) References Cited

U.S. PATENT DOCUMENTS

| | | | | |
|---|---|---|---|---|
| 9,444,702 | B1* | 9/2016 | Raponi | H04L 43/045 |
| 10,318,243 | B2* | 6/2019 | Gangwar | H04L 49/40 |
| 10,484,267 | B2* | 11/2019 | Gerstel | H04L 41/0668 |
| 10,791,045 | B2* | 9/2020 | Agarwal | H04L 45/02 |
| 10,817,627 | B1* | 10/2020 | Agarwal | G06F 30/394 |
| 2020/0267073 | A1* | 8/2020 | Agarwal | H04L 45/02 |
| 2021/0058289 | A1* | 2/2021 | Gangwar | H04L 45/02 |
| 2021/0160194 | A1* | 5/2021 | Prasad | H04L 49/90 |
| 2021/0168038 | A1* | 6/2021 | Gade | H04L 45/02 |

* cited by examiner

*Primary Examiner* — Naum Levin
(74) *Attorney, Agent, or Firm* — Leveque IP Law, P.C.

(57) ABSTRACT

The present disclosure provides computer-based methods and a system for synthesizing a NoC that advantageously generate balanced NoC topologies without end-to-end fairness or local credit-based arbitration, and improve NoC performance when destination device bridge ports support only one incoming physical link per channel. More particularly, a clock domain is assigned to certain routers that satisfies the minimum frequency for the router while reducing clock domain transitions to neighboring routers, and the traffic flows received by these routers are balanced based on the traffic flow packet rates.

20 Claims, 22 Drawing Sheets

NETWORK-ON-CHIP TOPOLOGY GENERATION

CROSS-REFERENCE TO RELATED APPLICATIONS

This application is a continuation-in-part (CIP) of U.S. patent application Ser. No. 17/076,403 (filed on Oct. 21, 2020, now U.S. Pat. No. 11,194,950), which is a continuation-in-part (CIP) of U.S. patent application Ser. No. 16/518,254 (filed on Jul. 22, 2019, now U.S. Pat. No. 10,817,627), the disclosures of which are incorporated herein by reference in their entireties.

BACKGROUND

The present disclosure relates to a network. More particularly, the present disclosure relates to a Network-on-Chip (NoC).

A NoC is a network-based communication subsystem implemented on an integrated circuit (IC), such as a System-on-Chip (SoC), that enables IC modules to exchange data more effectively than conventional bus or crossbar architectures. More particularly, a NoC is a router-based packet switching network that connects IC modules, such as intellectual property (IP) cores. A NoC includes various components, such as routers, resizers or serializers/deserializers (SerDes's), physical clock domain crossing (PCDC) buffers, pipeline elements, etc. NoC synthesis is a process that lays out and configures NoC components on the IC based on a NoC input specification. Generally, the NoC design must accommodate the data or traffic communicated between IC modules while satisfying various design constraints, such as power, performance and area (PPA), wiring cost, etc., that may conflict with one another.

NoC synthesis includes, inter alia, generating the topology for the NoC, which is the arrangement of routers, connections, and traffic paths or routes between IC modules. A poorly-designed NoC topology can significantly impact the NoC's PPA, wiring cost, etc., and may create Head-of-Line (HoL) blocking across classes of traffic. HoL blocking occurs when a sequence of packets from one traffic class is blocked by a packet from another traffic class even though the route for the blocked traffic class is clear. HoL blocking across traffic classes reduce NoC performance.

Importantly, a properly-designed NoC is balanced in order to minimize interference between different inputs ports sending traffic to the same output port at each arbitration point, such as, for example, a router. In NoCs without end-to-end Quality of Service (QoS) enforcement and locally fair arbitration schemes, imbalances among arrival rates at input ports sharing the same output port on the router can lead to losses due to arbitration and subsequently loss of performance. The presence of burstiness in traffic or variable packet sizes pose additional limitations for designing topologies that meet performance requirements.

DETAILED DESCRIPTION

Figure 1:
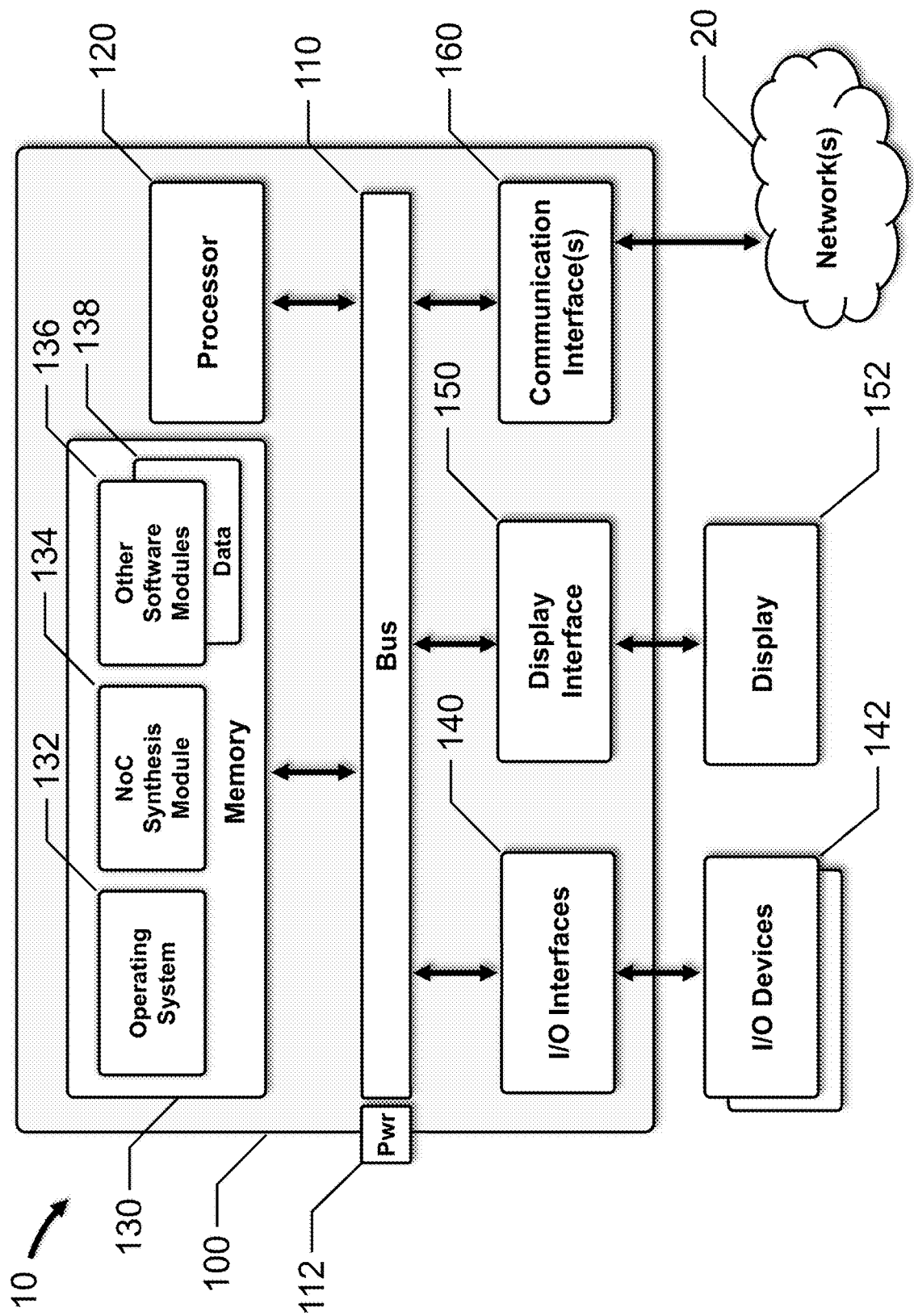
FIG. 1 depicts a block diagram of a NoC synthesis system, in accordance with an embodiment of the present disclosure.

Embodiments of the present disclosure will now be described with reference to the drawing figures, in which like reference numerals refer to like parts throughout.

Embodiments of the present disclosure advantageously provide a computer-based method and system for synthesizing a NoC that generates a balanced topology without the need to implement end-to-end fairness or local credit-based arbitration, and improve NoC performance when destination device bridge ports support only one incoming physical link per channel. More particularly, embodiments of the present disclosure assign a clock domain to certain routers that satisfies the minimum frequency for the router while reducing clock domain transitions to neighboring routers, and balance the traffic flows received by these routers based on the traffic flow packet rates.

In one embodiment, a computer-based method for synthesizing a NoC is provided. Physical data, device data, bridge data and traffic data are determined based on an input specification for the NoC, the physical data including dimensions for the NoC, the device data including a plurality of devices, each device having a location and dimensions, the bridge data including a plurality of bridge ports, each bridge port being associated with one of the devices and having a location, the traffic data including a plurality of traffic flows, each traffic flow having a packet rate. A virtual channel (VC) is assigned to each traffic flow to create a plurality of VC assignments. A baseline topology is generated based on the physical data, the device data, the bridge data, the traffic data and the VC assignments, the baseline topology including the plurality of bridge ports, a plurality of routers and a plurality of connections, each router having one or more input ports and one or more output ports. Each router that has at least one output port that is shared by traffic flows that are received on at least two input ports is identified. For each identified router, a minimum frequency for the identified router is calculated based on the packet rates of the traffic flows received by the identified router, and a clock domain is assigned to the identified router based on the minimum frequency for the identified router. The traffic flows received by the identified routers are balanced based on the packet rates of the traffic flows. A final topology is generated based on the baseline topology and the balanced traffic flows for the identified routers.

FIG. 1 depicts a block diagram of NoC synthesis system 10, in accordance with an embodiment of the present disclosure.

Computer 100 includes bus 110, processor 120, storage element or memory 130, I/O interfaces 140, display interface 150, and one or more communication interfaces 160. Generally, I/O interfaces 140 are coupled to I/O devices 142 using a wired or wireless connection, display interface 150 is coupled to display 152, and communication interface 160 is connected to network 20 using a wired or wireless connection.

Bus 110 is a communication system that transfers data between processor 120, memory 130, I/O interfaces 140, display interface 150, and communication interface 160, as well as other components not depicted in FIG. 1. Power connector 112 is coupled to bus 110 and a power supply (not shown).

Processor 120 includes one or more general-purpose or application-specific microprocessors that executes instructions to perform control, computation, input/output, etc. functions for computer 100. Processor 120 may include a single integrated circuit, such as a micro-processing device, or multiple integrated circuit devices and/or circuit boards working in cooperation to accomplish the functions of processor 120. In addition, processor 120 may execute computer programs or modules, such as operating system 132, NoC synthesis module 134, other software modules 136, etc., stored within memory 130.

Generally, memory 130 stores instructions for execution by processor 120 and data. Memory 130 may include a variety of non-transitory computer-readable medium that may be accessed by processor 120. In various embodiments, memory 130 may include volatile and nonvolatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for computer 100. The software modules also include NoC synthesis module 134 that provides functionality for synthesizing the NoC architecture. In certain embodiments, NoC synthesis module 134 may include a plurality of modules, each module providing specific individual functionality for synthesizing the NoC architecture, such as, for example, an input module, a VC module, a topology module, a routing module, a network generation module, a PCDC module, a link size and resizer module, a pipeline and timing component module, an output module, etc. Other software modules 136 may cooperate with NoC synthesis module 134 to provide functionality for synthesizing the NoC architecture.

Data 138 may include data associated with operating system 132, NoC synthesis module 134, other software modules 136, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to computer 100 and/or output from computer 100. As discussed above, I/O devices 142 are operably connected to computer 100 using a wired and/or wireless connection. I/O devices 142 may include a local processor coupled to a communication interface that is configured to communicate with computer 100 using the wired and/or wireless connection. For example, I/O devices 142 may include a keyboard, mouse, touch pad, joystick, etc.

Display interface 150 is configured to transmit image data from computer 100 to monitor or display 152.

Communication interface 160 is configured to transmit data to and from network 20 using one or more wired and/or wireless connections. Network 20 may include one or more local area networks, wide area networks, the Internet, etc., which may execute various network protocols, such as, for example, wired and/or wireless Ethernet, Bluetooth, etc. Network 20 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

Figure 2:
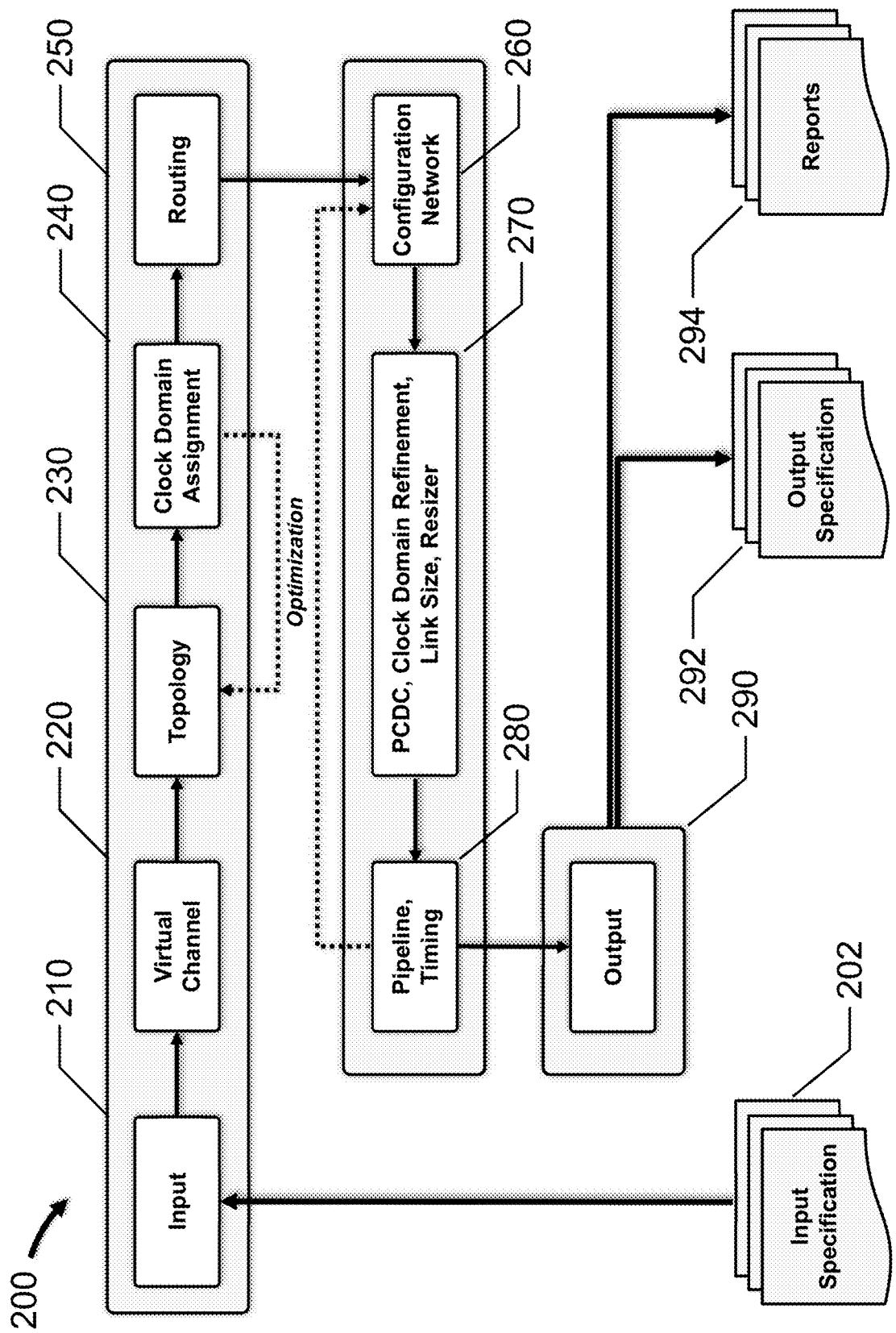
FIG. 2 depicts a NoC synthesis flow diagram, in accordance with an embodiment of the present disclosure.
Figure 3:
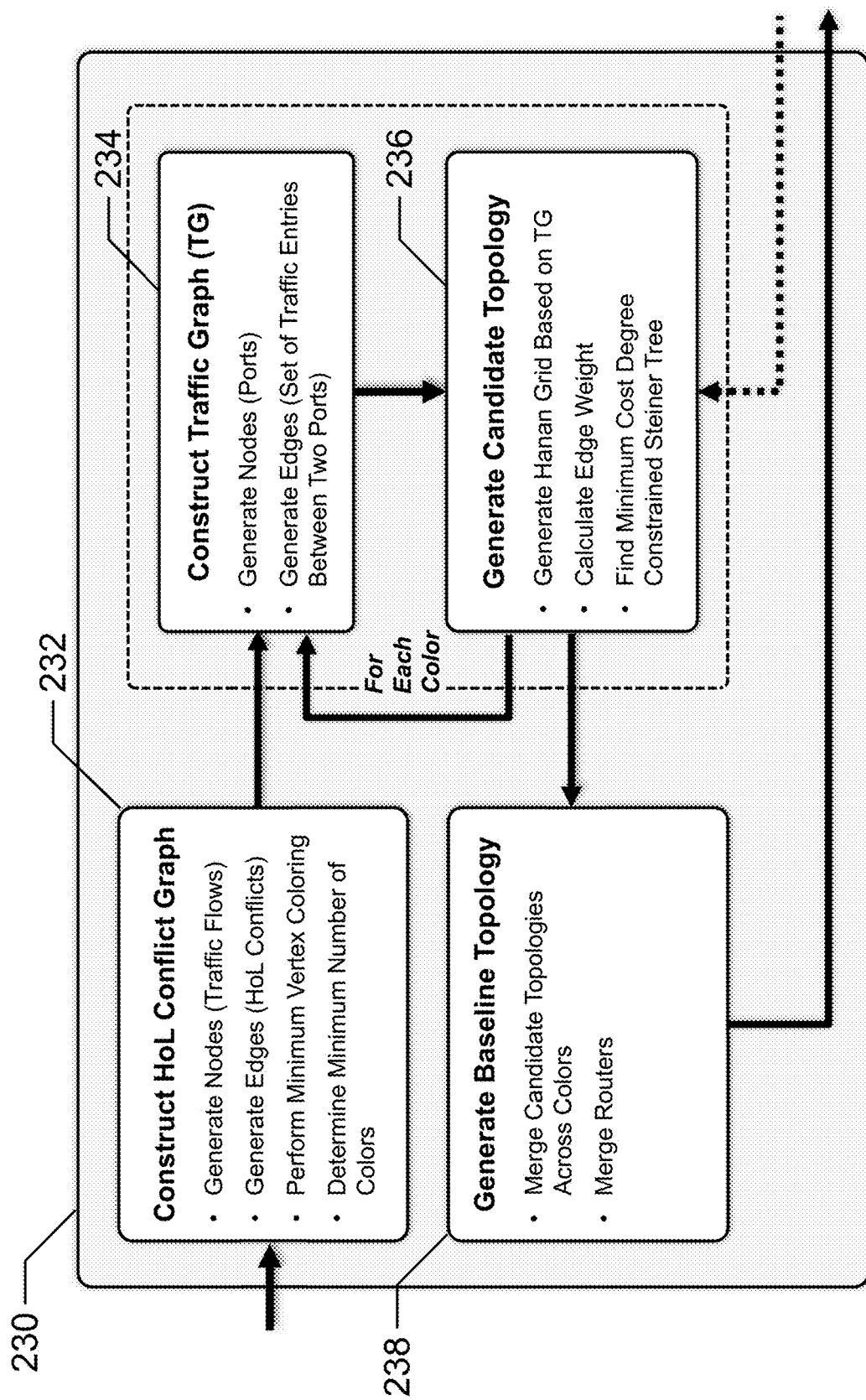
FIG. 3 depicts functionality associated with determining the topology for the NoC, in accordance with an embodiment of the present disclosure.

FIG. 2 depicts NoC synthesis flow diagram 200, while FIG. 3 depicts functionality at 230 associated with determining the topology for the NoC, in accordance with embodiments of the present disclosure.

As discussed above, the software modules include NoC synthesis module 134 that provides functionality for synthesizing the NoC architecture. In certain embodiments, NoC synthesis module 134 includes a plurality of modules, each module providing specific individual functionality for synthesizing the NoC architecture, such as, for example, an input module, a VC module, a topology module, a routing module, a network generation module, a PCDC module, a link size and resizer module, a pipeline and timing component module, an output module, etc.

At 210, NoC input specification 202 is retrieved from memory 130 and design information for the NoC is determined. For example, NoC input specification 202 may be received over network 20 and then stored as data 138 in memory 130. In another example, NoC input specification 202 may be created by a NoC designer using one or more software modules 136, and then stored as data 138 in memory 130.

Design information for the NoC includes, for example, physical data, device data, bridge data, traffic data, etc.

Additional design information may include voltage domain data, power domain data, clock domain data, address region data, synthesis constraints, etc.

Physical data include the dimensions for the NoC and a list of unrouteable areas. NoC components, such as bridges, routers, pipelines, resizers, connections, etc., are not typically located within unrouteable areas. In one example, the NoC is modeled as an array of cells arranged in rows and columns. The number of rows is defined by a height (in cells), and the number of columns is defined by a width (in cells). A cell width, in millimeters, micrometers, inches, etc., may also be provided. The cells are numbered sequentially, starting in the upper left corner of the array. Data for each unrouteable area include a location (cell number) and dimensions, such as a width (in cells) and a height (in cells). In another example, the NoC is modeled as a grid defined by cartesian coordinates (X, Y), with the origin located in the lower left corner of the grid. The height and the width are provided in normalized units, and a normalization factor may also be provided. Data for each unrouteable area include a location (X,Y) and dimensions, such as a width (X) and a height (Y).

Device data include a list of devices, such as IP cores, IC modules, etc., located within the NoC. Each device includes one or more bridge ports (i.e., signal interfaces). Data for each device may include a name, a location (cell number, X-Y coordinates, etc.), dimensions including a width (in cells, X dimension, etc.) and a height (in cells, Y dimension, etc.), a power domain, etc.

Bridge data include a list of bridge ports for the devices. Data for each bridge port may include a name, an associated device name, a location (cell number, X-Y coordinates, etc.), a data width (in bits), a low/high wire indicator, etc.

In many embodiments, the NoC is a packet-switched network that divides data packets into a sequence of message flow control units or flits. Each flit has the same size (in bits), and is divided into a sequence of data transfers across a physical connection or link. A physical unit, or phit, is the number of bits that can be transferred in parallel in a single data transfer cycle across the physical connection, i.e., the bitwidth of the link. In one example, the flit size for the NoC is 128 bits. A bridge port having a data width (phit size) of 32 bits needs 4 data transfer cycles to transfer each flit. In the context of the present disclosure, the link size for this bridge port is 4 (each unit of link size is 32 bits). Similarly, a bridge port having a data width of 16 bits needs 8 data transfer cycles to transfer each flit and has a link size of 8 (each unit of link size is 16 bits), while a bridge port having a data width of 64 bits needs 2 data transfer cycles to transfer each flit and has a link size of 2 (each unit of link size is 64 bits). Other flit sizes, such as, for example, 32 bits, 64 bits, 256 bits, 512 bits, etc. may also be used. Different flow control techniques may be used in alternative embodiments.

Traffic data include a list of traffic flows for the NoC. Data for each traffic flow include a source bridge port, a destination bridge port, a peak traffic rate, an average traffic rate, and a traffic class. The source bridge port and the destination bridge port are included within the list of bridge ports. The peak traffic rate and the average traffic rate are provided in bits or bytes per second, such as, for example, b/s, kb/s, Mb/s, Gb/s, Tb/s, etc., B/s, KB/s, MB/s, GB/s, TB/s, etc. Generally, the traffic class provides one or more metrics that differentiate the level of NoC performance that may be provided for each traffic flow. In many embodiments, the traffic class includes a quality of service (QoS) metric and a latency sensitivity (LS) metric. The QoS metric provides a mechanism to prioritize traffic within the NoC, while the LS metric indicates the sensitivity of the traffic to network delays. For example, for an integer QOS metric with four possible values (e.g., 0 to 3) and a Boolean LS metric with two possible values (e.g., true or false), 8 different traffic classes are provided. In this example, a QoS value of 0 and an LS value of true provides the best potential NoC performance. Other metrics are also contemplated. Additionally, a message type may also be provided, such as, for example, a read request, a write request, a read/write request, etc.

Figure 4:
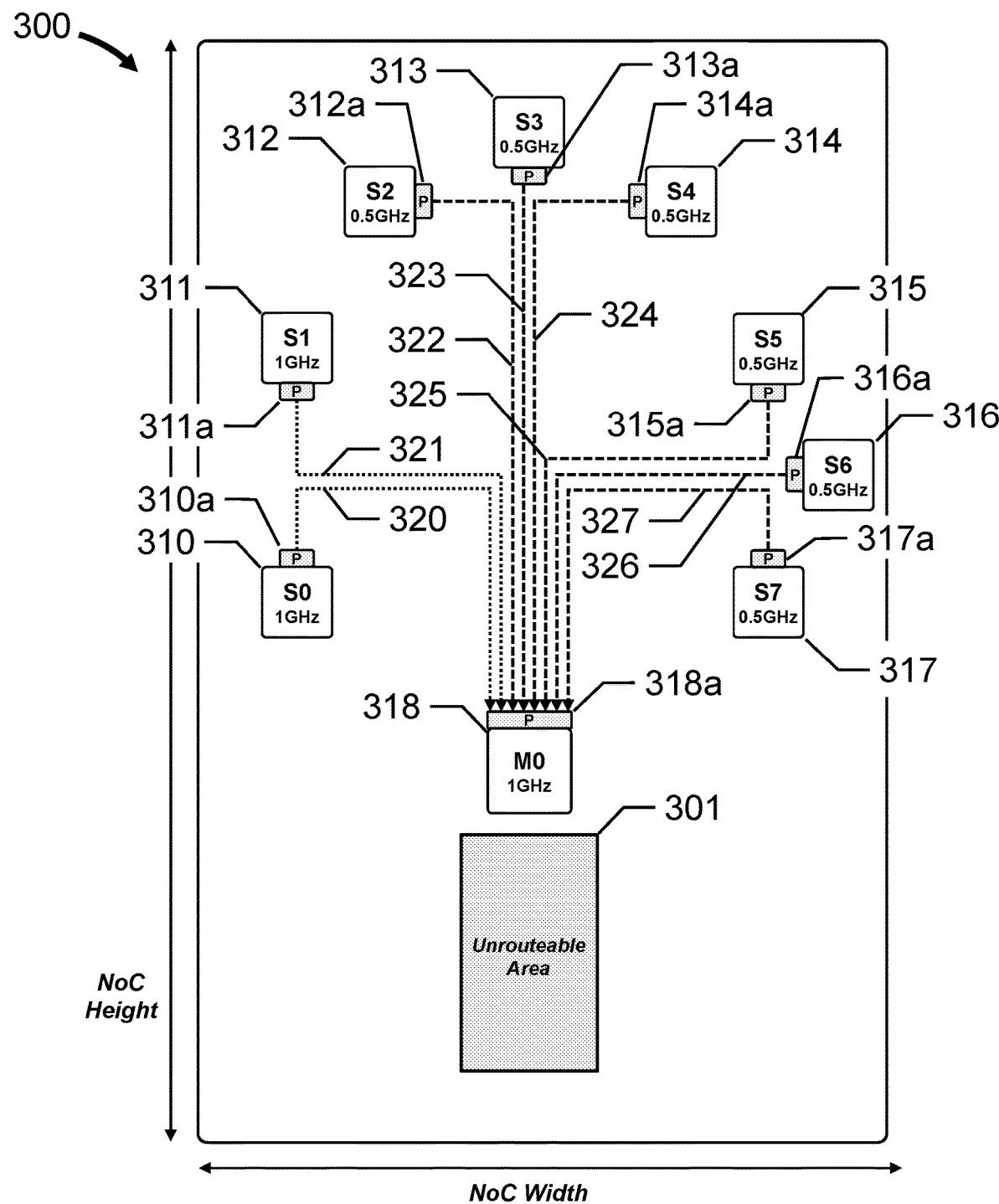
FIG. 4 depicts a graphical representation of an input specification for a NoC, in accordance with an embodiment of the present disclosure.

FIG. 4 depicts a graphical representation of NoC input specification 202, in accordance with an embodiment of the present disclosure. A user may view NoC 300 on display 152.

NoC 300 has a NoC height and a NoC width and includes unrouteable area 301 located within a central portion of NoC 300. Nine devices are dispersed throughout NoC 300, none of which are located within unrouteable area 301. Each device includes at least one bridge port ("P"). For ease of illustration, each device has a single bridge port. Device 310 includes bridge port 310a, device 311 includes bridge port 311a, device 312 includes bridge port 312a, device 313 includes bridge port 313a, device 314 includes bridge port 314a, device 315 includes bridge port 315a, device 316 includes bridge port 316a, device 317 includes bridge port 317a, and device 318 includes bridge port 318a. Generally, the location of each bridge port is limited by the location of the associated device and the footprint of the device within the NoC, i.e., the device width and height. For example, for an 8 cell×8 cell NoC, a device located at cell number 9 having a width of 1 cell and a height of 3 cells supports one or more bridge ports located at cell numbers 9, 17 and/or 25.

Eight sets of traffic flows between the devices are depicted; each traffic flow set includes at least one traffic flow. For example, a traffic flow set may include a traffic flow that defines a read request and a traffic flow that defines a write request. Traffic flow set 320 flows between bridge port 310a and bridge port 318a. Traffic flow set 321 flows between bridge port 311a and bridge port 318a. Traffic flow set 322 flows between bridge port 312a and bridge port 318a. Traffic flow set 323 flows between bridge port 313a and bridge port 318a. Traffic flow set 324 flows between bridge port 314a and bridge port 318a. Traffic flow set 325 flows between bridge port 315a and bridge port 318a. Traffic flow set 326 flows between bridge port 316a and bridge port 318a. Traffic flow set 327 flows between bridge port 317a and bridge port 318a.

In many embodiments, devices 310, 311, 312, 313, 314, 315, 316 and 317 may be AXI slave network interfaces (ASNIs), while device 318 may be an AXI master network interfaces (AMNIs). Generally, AMNIs may send data to, as well as request data from, ASNIs. For ease of explanation, device 310 is labeled "S0," device 311 is labeled "S1," device 312 is labeled "S2," device 313 is labeled "S3," device 314 is labeled "S4," device 315 is labeled "S5," device 316 is labeled "S6," device 317 is labeled "S7,' and device 318 is labeled "M0." Other configurations and types of devices may be accommodated.

Referring back to FIG. 2, at 220, a VC is assigned to each traffic flow. Generally, VCs are assigned to reduce conflicts and simplify the subsequent topology generation. In one embodiment, the VCs are assigned using an iterative estimation process that performs a specify-evaluate-refine loop until no significant improvement in the estimations are generated. Other assignment methodologies are also contemplated.

At 230, a topology for the NoC is determined.

Referring back to FIG. 3, at 232, an HCG is constructed based on the traffic data and the VC assignments.

Figure 5:
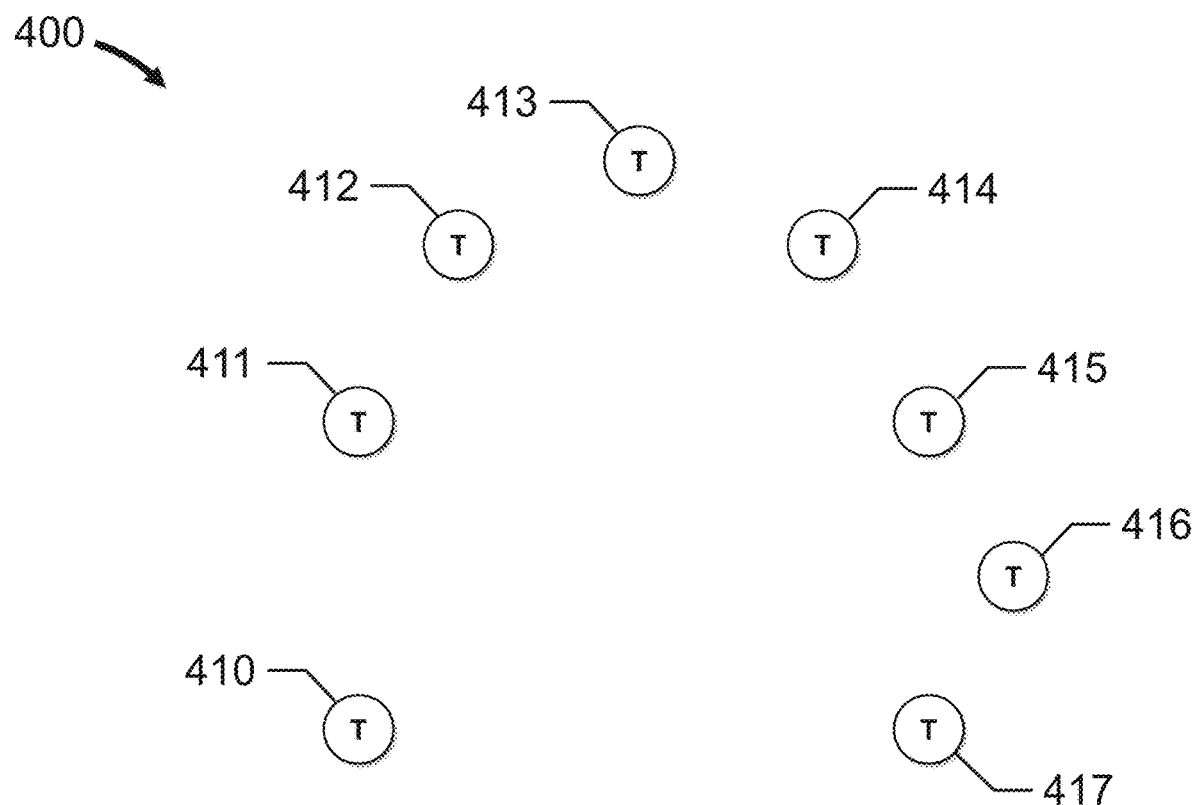
FIG. 5 depicts an HoL conflict graph (HCG) for a NoC, in accordance with an embodiment of the present disclosure.

FIG. 5 depicts HCG 400 for NoC 300, in accordance with an embodiment of the present disclosure. A user may view HCG 400 on display 152.

In this embodiment, HCG 400 includes traffic nodes 410 to 417 and no HoL edges. Each traffic node represents a traffic flow and each HoL edge represents an HoL conflict. An HoL conflict is defined as two traffic flows that are assigned to the same VC but have different traffic classes, such as, for example, different QoS values and/or different LS values. For the purpose of illustration only, each traffic flow set 320, 321, 322, 323, 324, 325, 326 and 327 has a single traffic flow from the respective slave device to master device 318, which results in eight traffic nodes 410 to 417. A color is then assigned to each traffic node 410 to 417 to minimize HoL conflicts, with adjacent traffic nodes receiving different colors. In certain embodiments, minimum vertex coloring is used to find the minimum number of colors to assign to traffic nodes 410 to 417. Because there are no HoL conflicts, HCG 400 includes eight traffic nodes 410 to 417 in one color (white).

Referring back to FIG. 3, at 234, a TG for each color is constructed based on the physical data, the bridge data, the traffic data, and the modified HCG. In other words, a plurality of traffic graphs are constructed based on the physical data, the bridge data, the traffic data and the modified HCG.

Figure 6A:
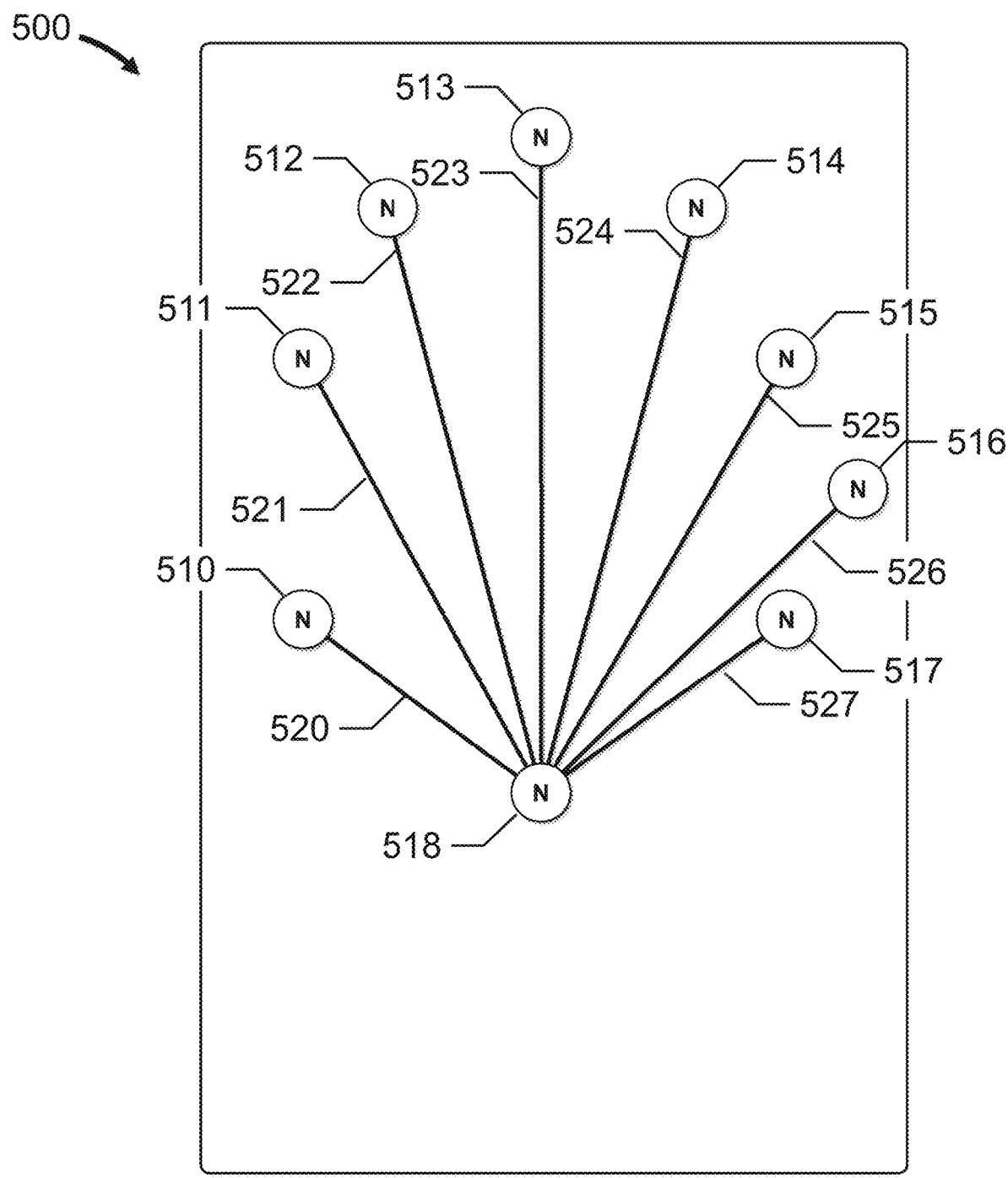
FIG. 6A depicts a traffic graph (TG) for a NoC, in accordance with an embodiment of the present disclosure.

FIG. 6A depicts TG 500 for NoC 300, in accordance with an embodiment of the present disclosure. TG 500 includes the color from HCG 400, i.e., white. A user may view TG 500 on display 152.

TG 500 includes nodes 510 to 518 and edges 520, 521, 522, 523, 524, 525, 526, and 527. Each node 510 to 518 is associated with a different bridge port, and each edge 520, 521, 522, 523, 524, 525, 526, and 527 connects pairs of nodes and is associated with a set of traffic flows between two bridge ports. As discussed above, each set of traffic flows includes at least one traffic flow.

More particularly, node 510 is associated with bridge port 310a, node 511 is associated with bridge port 311a, node 512 is associated with bridge port 312a, node 513 is associated with bridge port 313a, node 514 is associated with bridge port 314a, node 515 is associated with bridge port 315a, node 516 is associated with bridge port 316a, node 517 is associated with bridge port 317a, and node 518 is associated with bridge port 318a. Similarly, edge 520 is associated with traffic flow set 320, edge 521 is associated with traffic flow set 321, edge 522 is associated with traffic flow set 322, edge 523 is associated with traffic flow set 323, edge 524 is associated with traffic flow set 324, edge 525 is associated with traffic flow set 325, edge 526 is associated with traffic flow set 326, and edge 527 is associated with traffic flow set 327.

At 236, the candidate topology for each color is generated based on the respective TG. In other words, a candidate topology is generated for each TG. The candidate topology includes bridge ports, routers and connections.

FIGS. 6B to 6F depict a series of grids and topologies for TG 550, according to embodiments of the present disclosure. A user may view these grids and topologies on display 152.

First, a grid is generated based on the TG. The grid includes nodes and intersections that are formed by grid lines passing through each node. Each node is associated with a different bridge port and is located at a different intersection. In one embodiment, the grid is a Hanan grid formed by orthogonal vertical and horizontal grid lines. Other types of grids may also be generated, such as, for example, a lattice, a square or unit distance grid, etc.

Generally, the functionality at 234 and 236 is performed for each color. In one embodiment, the functionality at 234 is performed for all of the colors, and then the functionality at 236 is performed for all of the colors. In another embodiment, the functionality at 234 is performed for the first color, and then the functionality at 236 is performed for the first color. Next, the functionality at 234 is performed for the second color, and then the functionality at 236 is performed for the second color, and so on.

Figure 6B:
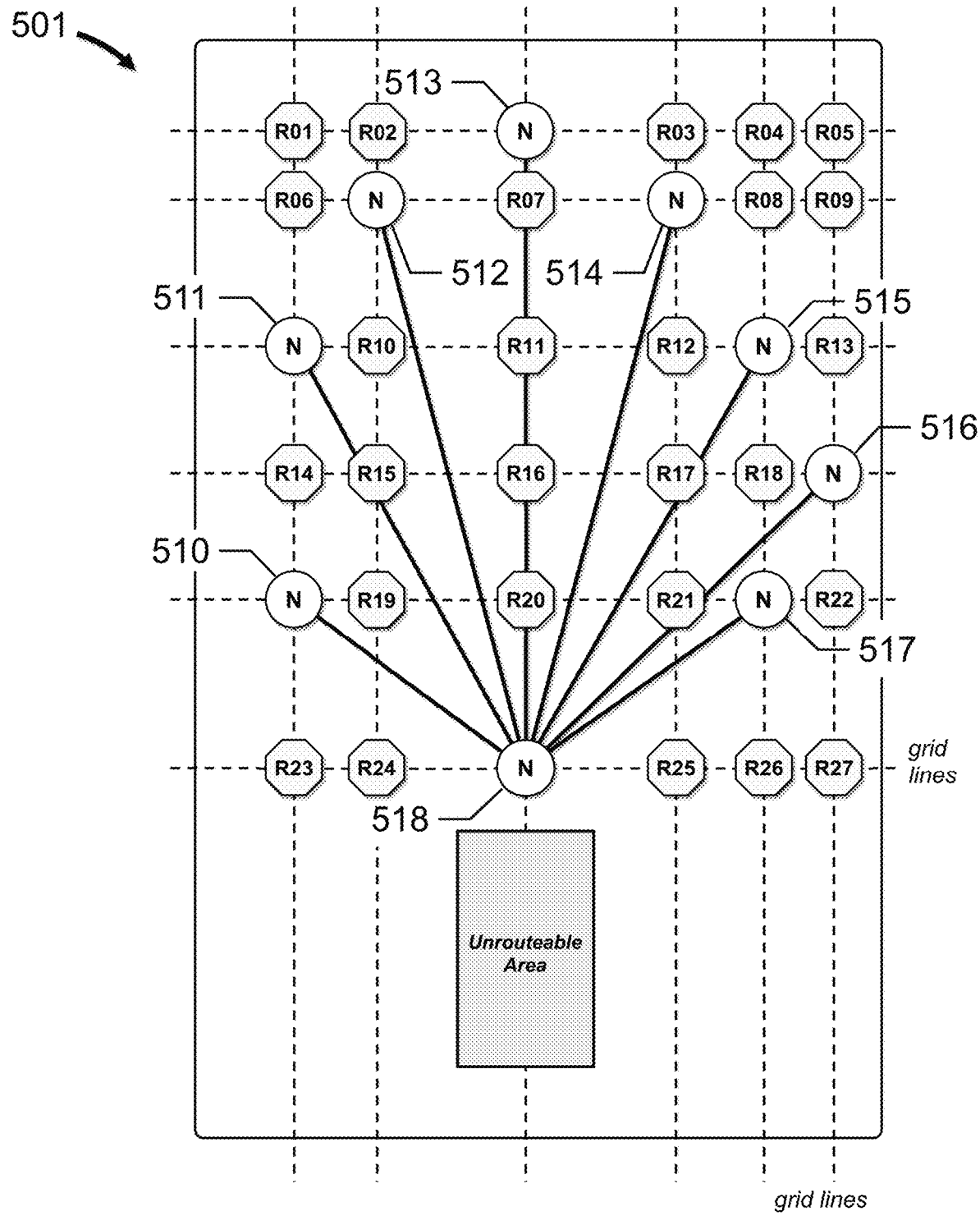
FIGS. 6B to 6F depict a series of graphs, grids and topologies for the TG depicted in FIG. 6A, in accordance with an embodiment of the present disclosure.

FIG. 6B depicts Hanan grid 501 for TG 500.

Nodes 510 to 518 are located at respective intersections, and a router is added to the grid at each intersection not occupied by a node. In this embodiment, 27 routers are added to the grid, i.e., router R01 to R27. Adjacent nodes and routers are then connected to create an initial mesh or topology.

Figure 6C:
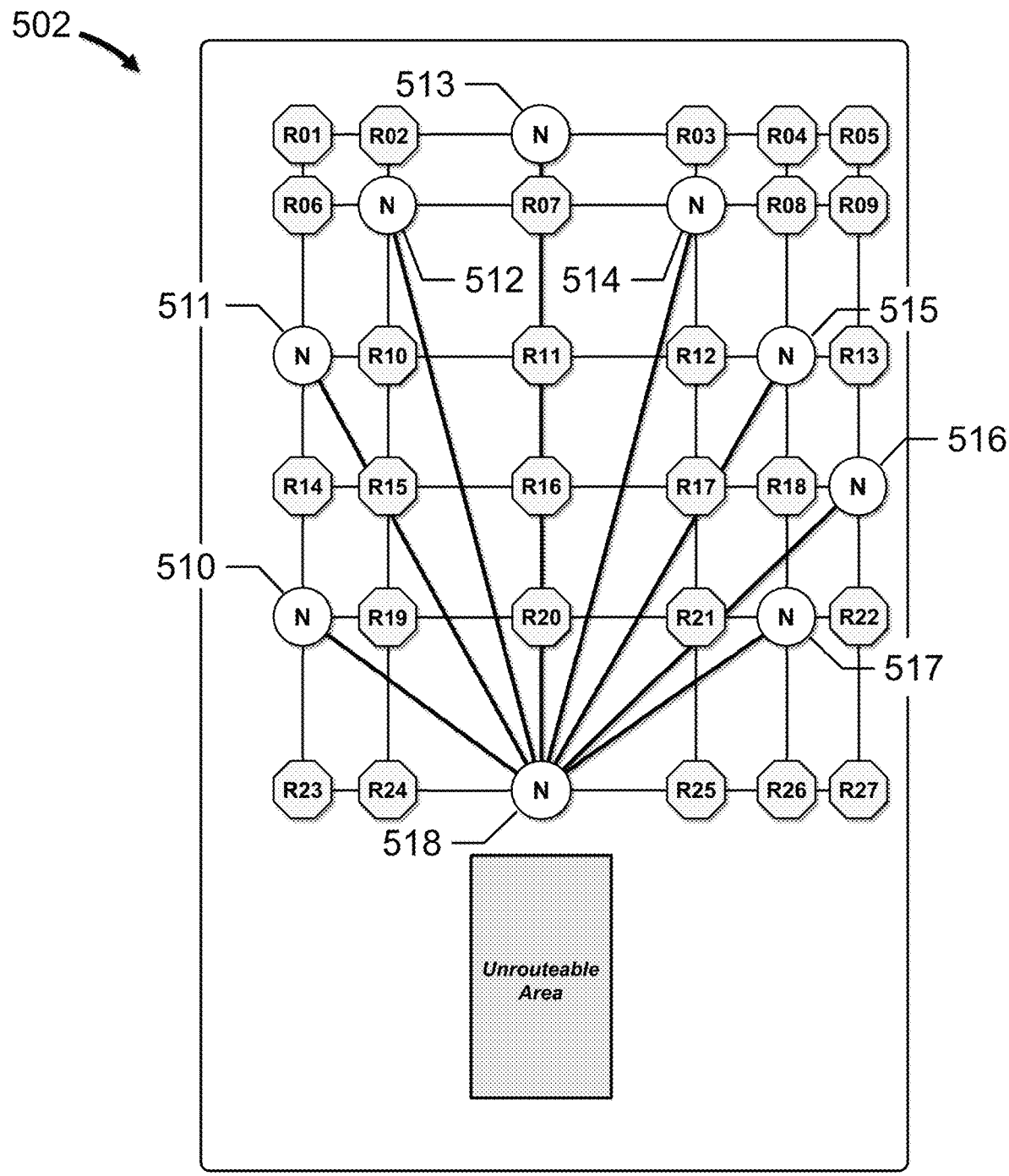

FIG. 6C depicts an initial mesh or topology 502 for TG 500.

Node 510 is connected to routers R14, R19 and R23. Node 511 is connected to routers R06, R10 and R14. Node 512 is connected to routers R02, R06, R07 and R10. Node 513 is connected to routers R02, R03 and R07. Node 514 is connected to routers R03, R07, R08 and R12. Node 515 is connected to routers R08, R12, R13 and R18. Node 516 is connected to routers R13, R18 and R22. Node 517 is connected to routers R18, R21, R22 and R26. Node 518 is connected to routers R20, R24 and R25.

Router R01 is connected to routers R02 and R06. Router R02 is connected to nodes 512 and 513 and router R01. Router R03 is connected to nodes 513 and 514 and router R04. Router R04 is connected to routers R03, R05 and R08. Router R05 is connected to routers R04 and R09. Router R06 is connected to nodes 511 and 512 and router R01. Router R07 is connected to nodes 512, 513 and 514 and router R11. Router R08 is connected to nodes 514 and 515 and routers R04 and R09. Router R09 is connected to routers R05, R08 and R13. Router R10 is connected to nodes 511 and 512 and routers R11 and R15. Router R11 is connected to routers R07, R10, R12 and R16. Router R12 is connected to nodes 514 and 515 and routers R11 and R17. Router R13 is connected to nodes 515 and 516 and router R09. Router R14 is connected to nodes 510 and 511 and router R15. Router R15 is connected to routers R10, R14, R16 and R19. Router R16 is connected to routers R11, R15, R17 and R20. Router R17 is connected to routers R12, R16, R18 and R21. Router R18 is connected to nodes 515, 516 and 517 and router R17. Router R19 is connected to node 510 and routers R15, R20 and R24. Router R20 is connected to node 518 and routers R16, R19 and R21. Router R21 is connected to node 517 and routers R17, R20 and R25. Router R22 is connected to nodes 516 and 517 and router R27. Router R23 is connected to node 510 and router R24. Router R24 is connected to node 518 and routers R19 and R23. Router R25 is connected to node 518 and routers R21 and R26. Router R26 is connected to node 517 and routers R25 and R27. Router R27 is connected to routers R22 and R26.

A weight is then calculated for each connection, based on the traffic data, to create a weighted mesh or topology. In one embodiment, a traffic criticality index (TCI) is calculated for each traffic flow, and the TCI for each traffic flow is then added to a heating index for each connection that falls within a rectilinear bounding box for that traffic flow. The TCI may be based on traffic criticality and rate. The rectilinear bounding box for a particular traffic flow is defined by the source node (source bridge port) and the destination node (destination bridge port) of that traffic flow. In one embodiment, the weight for each connection is inversely proportional to the heating index for that connection, while in another embodiment, the weight is proportional to the heating index. The weights are then applied to the initial mesh or topology to create the weighted mesh or topology.

Figure 6D:
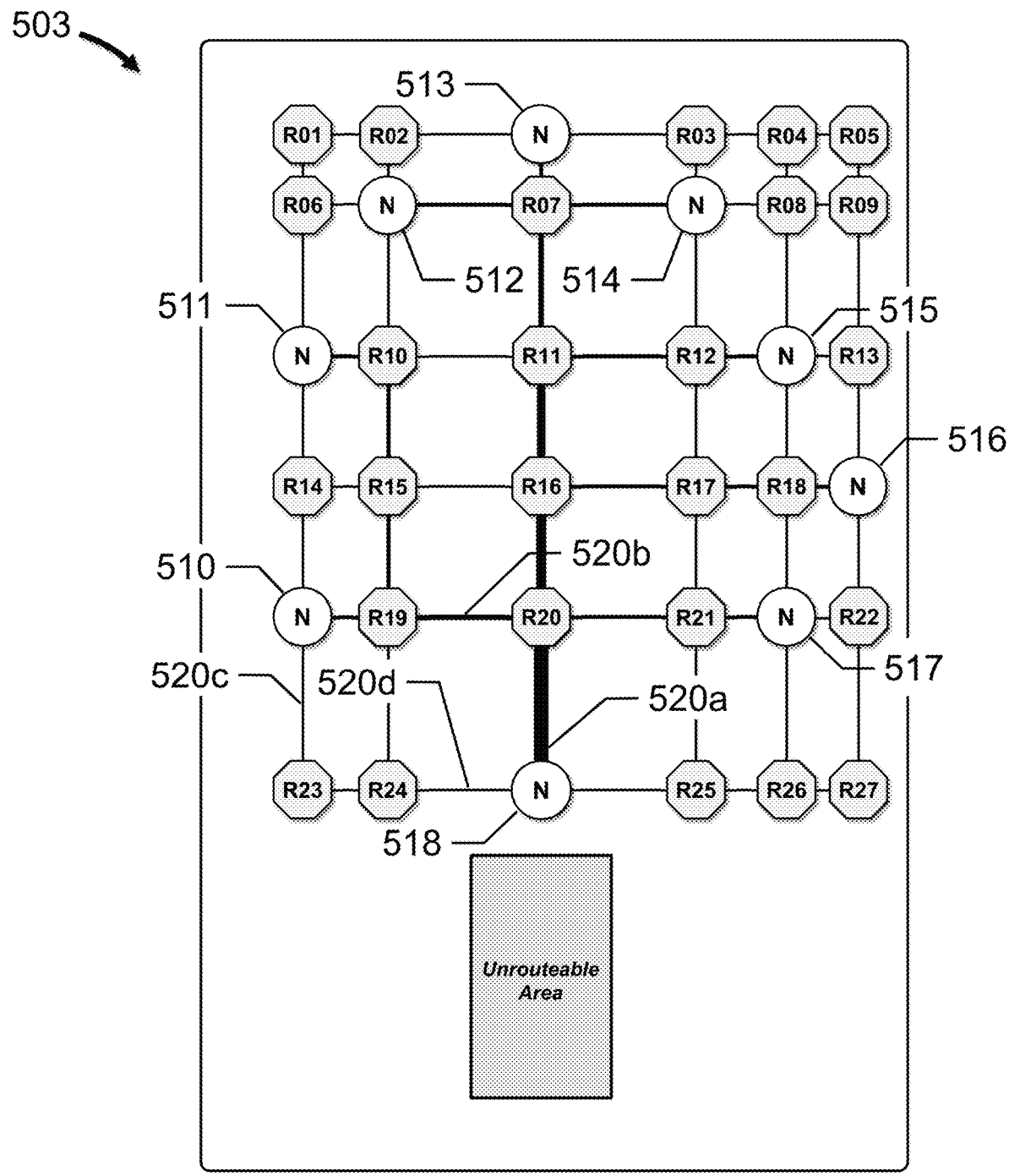

FIG. 6D depicts a weighted mesh or topology 503 for TG 500.

The different weights for each connection are represented by different line thicknesses. The thinnest lines represent connections through which traffic does not flow. For example, edge 530 is associated with traffic flow set 320, which includes at least one traffic flow between node 510 (bridge port 310a) and node 518 (bridge port 318a). The rectilinear bounding box for traffic flow set 320 is defined by node 510 and node 518, represented by connections 520a, 520b, 520c and 520d. The weight for connections 520c and 520d are the lowest, the weight for connection 520b is greater than the weight for connections 520c and 520d, and the weight for connection 520a is the largest. Notably, the weight for connection 520a includes contributions from the remaining edges 521, 522, 523, 524, 525, 526 and 527, while the weight for connection 520b includes a contribution from edge 521.

A degree-constrained minimum-cost mesh or topology is then determined based on the weighted mesh or topology, including removing one or more connections and one or more routers. In one embodiment, a degree-constrained minimum-cost Steiner tree is determined, which generates a plurality of trees, based on the degree and the number of nodes, and then selects the lowest cost tree. The connections and routers through which traffic does not flow are then removed from the degree-constrained minimum-cost mesh or topology.

Figure 6E:
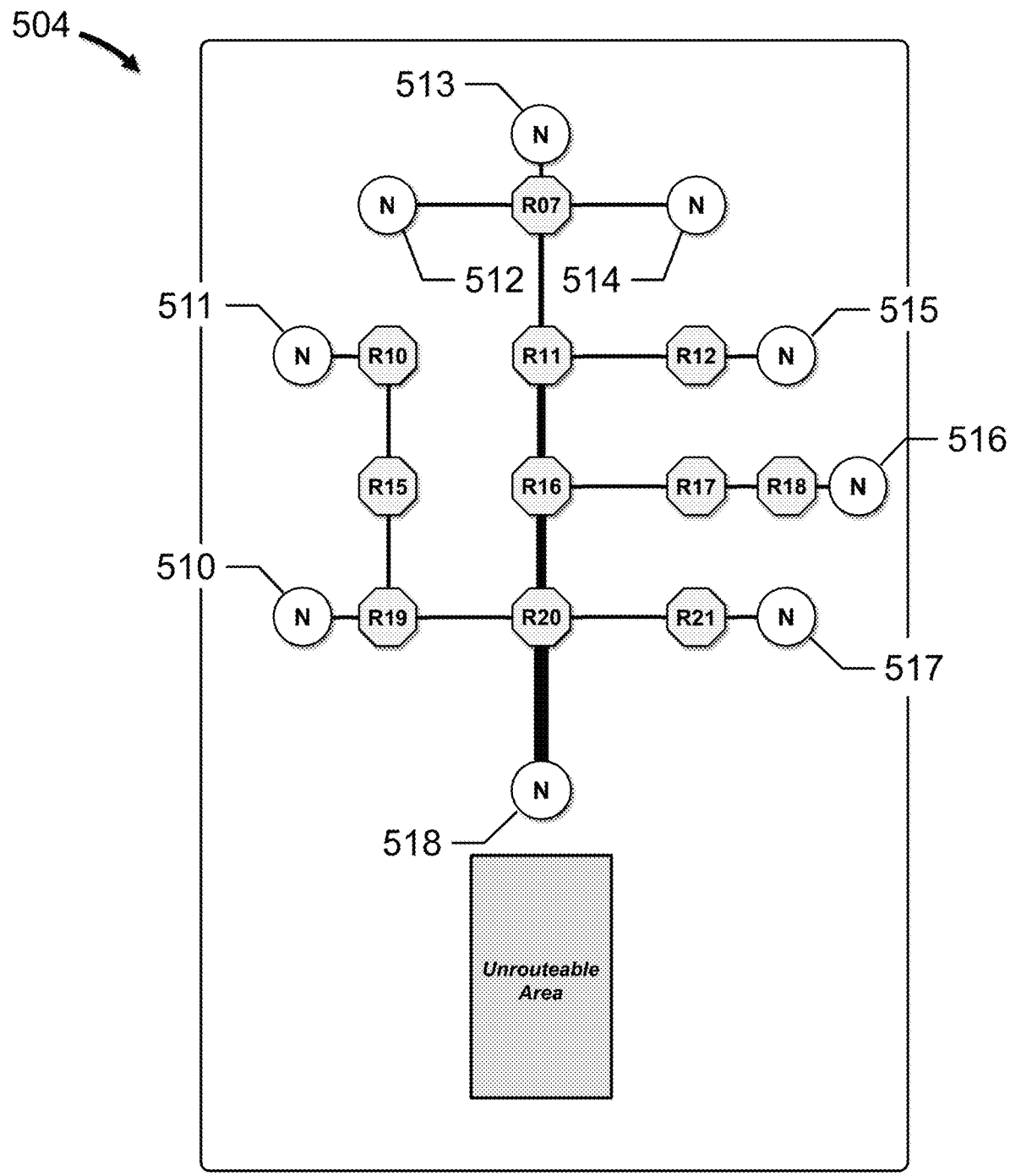

FIG. 6E depicts a degree-constrained minimum-cost mesh or topology 504 for TG 500.

Degree-constrained minimum-cost topology 504 includes nodes 510 to 518, and routers R07 and R10 to R21. The connection weights are the same as FIG. 6D.

Node 510 is connected to router R19, node 511 is connected to router R10, nodes 512, 513 and 514 are connected to router R07, node 515 is connected to router R12, node 516 is connected to router R18, node 517 is connected to router R21 and node 518 is connected to router R20.

Router R07 is connected to nodes 512, 513 and 514 and router R05. Router R10 is connected to node 511 and router R15. Router R11 is connected to routers R07, R12 and R16. Router R12 is connected to node 515 and router R11. Router R15 is connected to routers R10 and R19. Router R16 is connected to router R17. Router R17 is connected to routers R16 and R18. Router R18 is connected to node 516 and router R17. Router R19 is connected to node 510 and routers R15 and R20. Router R20 is connected to node 518 and routers R16, R19 and R21. Router R21 is connected to node 517 and router R20.

A candidate topology is then generated from the degree-constrained minimum-cost tree.

Figure 6F:
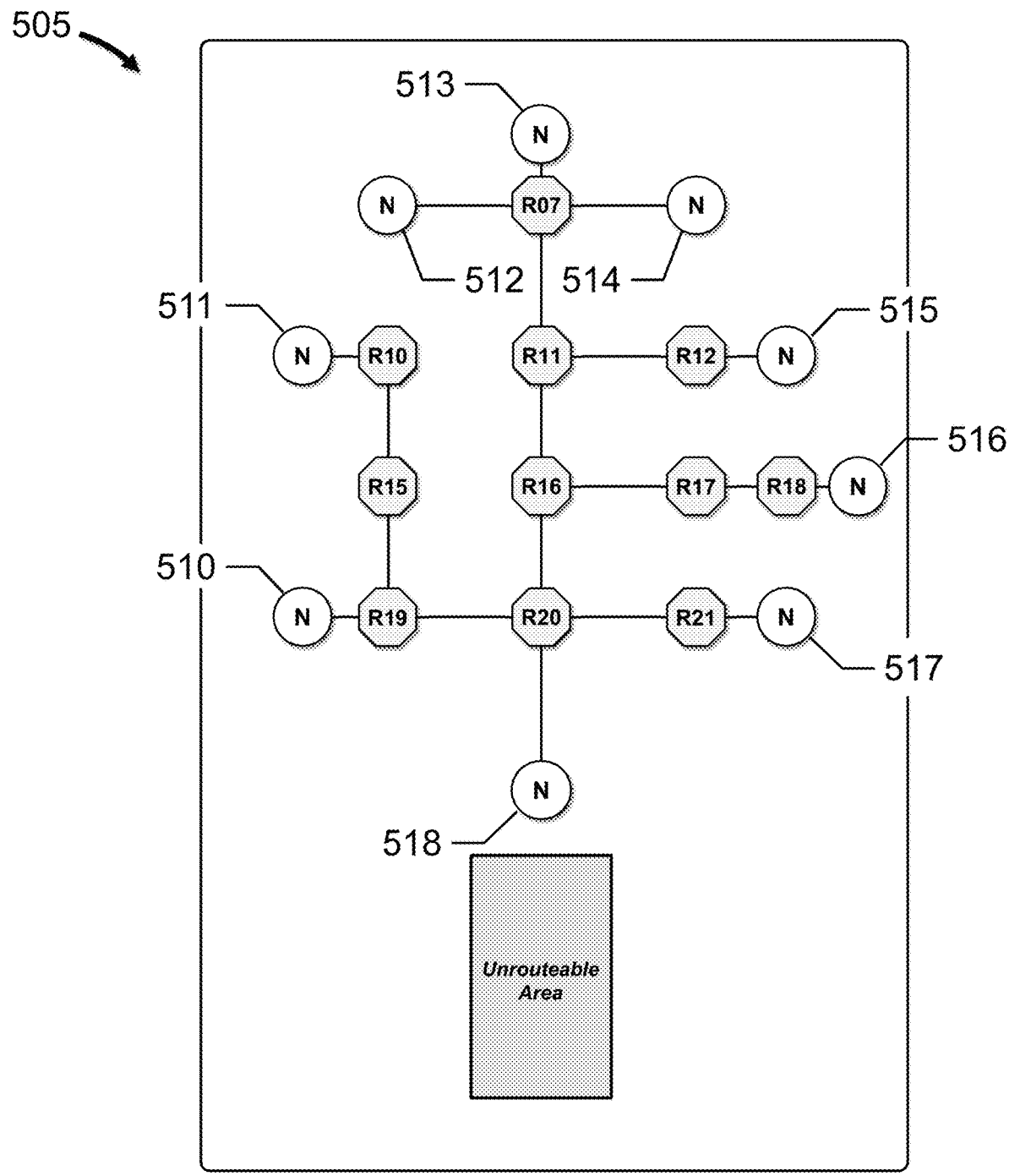

FIG. 6F depicts a candidate topology 505 for TG 500.

Candidate topology 505 includes nodes 510 to 518, and routers R07, R10, R11, R12 and R16 to R21. The connections between the nodes and the routers are the same as FIG. 6D. Generally, a user may view grids 501 and topologies 502 to 505 on display 152.

Referring back to FIG. 3, at 238, the baseline topology is generated.

The candidate topologies are then merged to create a merged candidate topology, and the routers are initially merged within the merged candidate topology to generate a baseline topology. In this embodiment, candidate topology 505 is also the merged candidate topology 505.

The routers are then merged and the baseline topology is generated.

Figure 7:
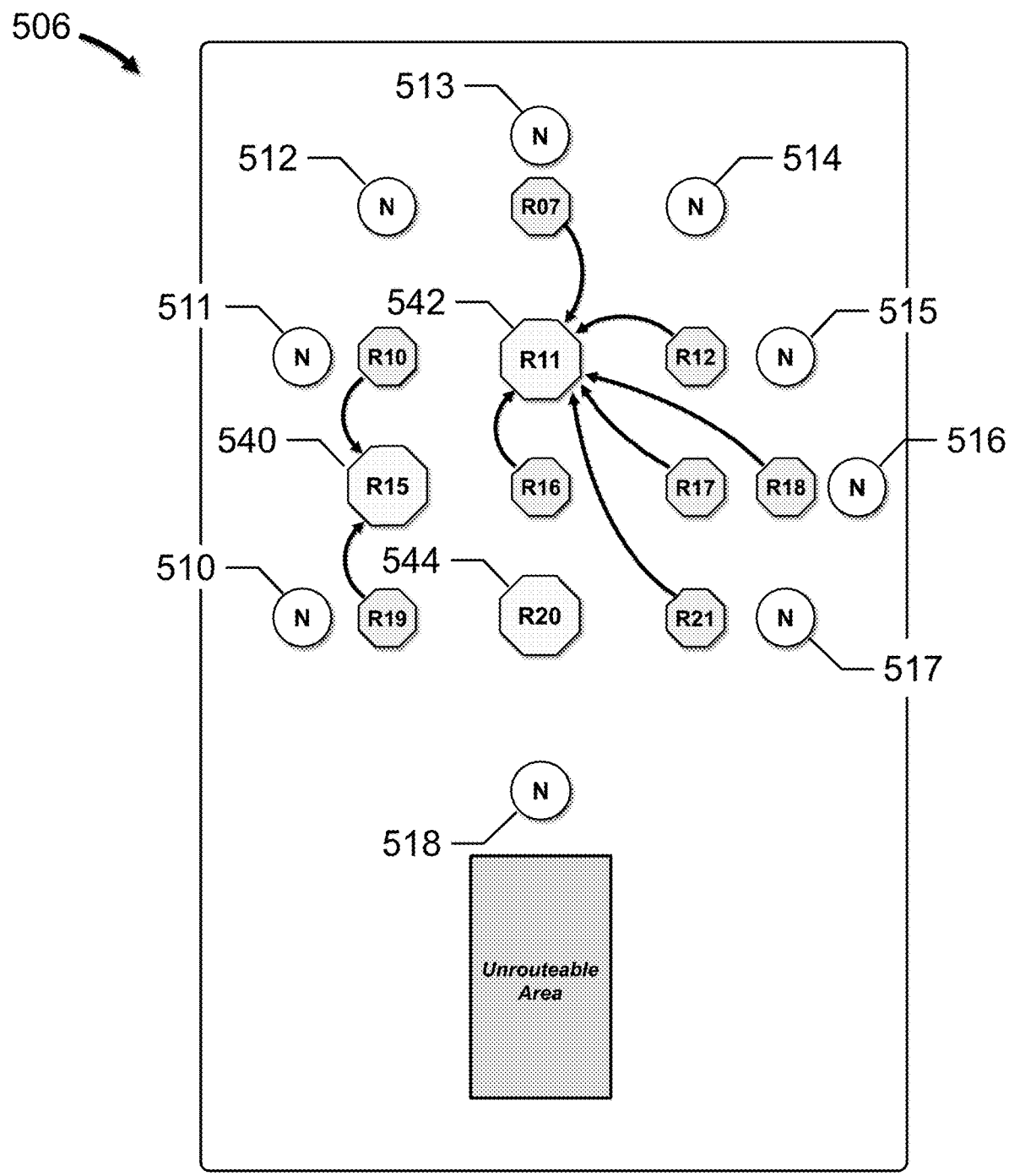
FIG. 7 depicts router merging for the merged candidate topology, in accordance with an embodiment of the present disclosure.

FIG. 7 depicts router merging for merged candidate topology 505, in accordance with an embodiment of the present disclosure.

Router merging diagram 506 illustrates a process for merging routers in merged candidate topology 505. Generally, routing merging reduces the number of routers in the topology by merging or combining two or more routers into a single router. Merged routers may also be relocated, i.e., placed at a location that does not correspond to any of the grid locations of the original routers. Router relocation may occur after the candidate topologies for each color have been merged, and/or during a later optimization process.

Routers R10 and R19 have been merged into router R15, also labeled router 540 for clarity. Routers R07 R12, R16, R17, R18 and R21 have been merged into router R11, also labeled router 542 for clarity. Router R20 is also labeled router 544 for clarity.

Figure 8:
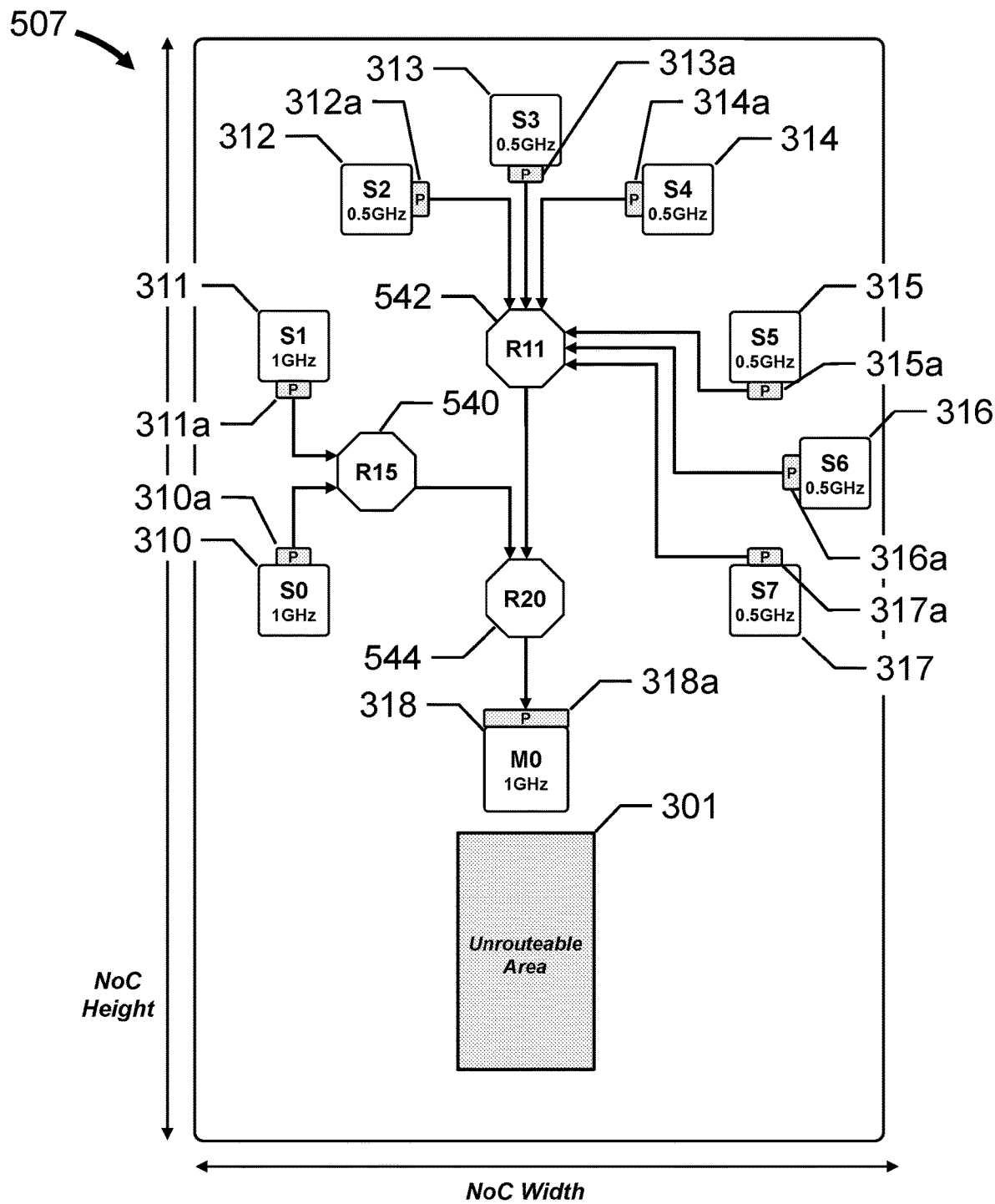
FIG. 8 depicts a baseline topology for a NoC, in accordance with an embodiment of the present disclosure.

FIG. 8 depicts baseline topology 507 for NoC 300, in accordance with an embodiment of the present disclosure. A user may view baseline topology 507 on display 152.

Baseline topology 507 has the same NoC height and width as NoC 300, and includes unrouteable area 301 located within a central portion of baseline topology 507. Device 310 is connected to router 540 through bridge port 310a. Device 311 is connected to router 540 through bridge port 311a. Device 312 is connected to router 542 through bridge port 312a. Device 313 is connected to router 542 through bridge port 313a. Device 314 is connected to router 542 through bridge port 314a. Device 315 is connected to router 542 through bridge port 315a. Device 316 is connected to router 542 through bridge port 316a. Device 317 is connected to router 542 through bridge port 317a. Device 318 is connected to router 544 through bridge port 318a.

Baseline topology 507 may be determined by NoC synthesis module 134 based on the method described above. Alternatively, baseline topology 507 may be developed by a different software module 136, a different computer system, etc., and retrieved from memory 130, received by computer 100, etc., along with traffic data, etc.

In many embodiments, neither end-to-end QoS support nor local, credit-based arbitration (i.e., the use of local credits to mitigate arbitration losses) may be imposed on baseline topology 507 for various reasons. Instead, arbitration decisions at each arbitration point, e.g., at each router, are based on local information only, such as, for example, least recently used (LRU) arbitration, round robin (RR) arbitration, etc. For routers with multiple input ports that share a single output port, each arbitration decision grants access to the output port to only one of the input ports per cycle.

Embodiments of the present disclosure advantageously generate balanced topologies for NoCs without end-to-end fairness or local credit-based arbitration, and improve NoC performance when destination device bridge ports support only one incoming physical link per channel. More particularly, embodiments of the present disclosure assign a clock domain to certain routers that satisfies the minimum frequency for the router while reducing clock domain transitions to neighboring routers, and balance the traffic flows received by these routers based on the traffic flow packet rates.

Referring back to FIG. 2, at 240, valid clock domains may be determined for each location, and initial clock domains may be assigned according to the traffic flows and the topology.

Each router that has an output {port, VC} combination that is shared by traffic flows that are received on at least two input ports is identified. A minimum frequency for each identified router is calculated based on the traffic flow packet rates at the input ports. A clock domain is then assigned to each identified router that satisfies the minimum frequency for the router.

Minimum frequencies are not determined for the remaining, "non-identified" routers, and their clock domains may be assigned based on location, traffic flows, topology, etc.

After the initial clock domains have been assigned at 240, the minimum cost degree constrained Steiner tree computation at 236 may be revisited by adding a performance cost to identify performance violations and augment the PPA cost models used during the initial topology exploration. For those embodiments that receive baseline topology 507 from an external source, the minimum cost degree constrained Steiner tree analysis at 236 may be performed using the performance cost to identify performance violations.

The performance cost includes a router clock domain (CD) violation cost and a packet rate balancing cost. The router CD violation cost imposes a cost on routers that violate their minimum frequency requirement, as all such routers may potentially result in loss of bandwidth and have to be minimized. The packet rate balancing cost imposes a cost on imbalances between packet rates on inputs ports sharing the same output port on a router, which may result in credit losses from arbitration at the router and hence performance loss in policies where a lost credit cannot be recovered. Generally, the performance cost does not effect non-identified routers.

Flow then proceeds to 238, which revises baseline topology 507 based on the revised minimum cost degree constrained Steiner tree computation, and then flow proceeds to 240, which revises the clock domain assignments for the routers of the revised topology. This flow may be repeated until the routers do not violate clock domain constraints and the packet arrival rates on all of the router input ports are balanced.

Figure 9A:
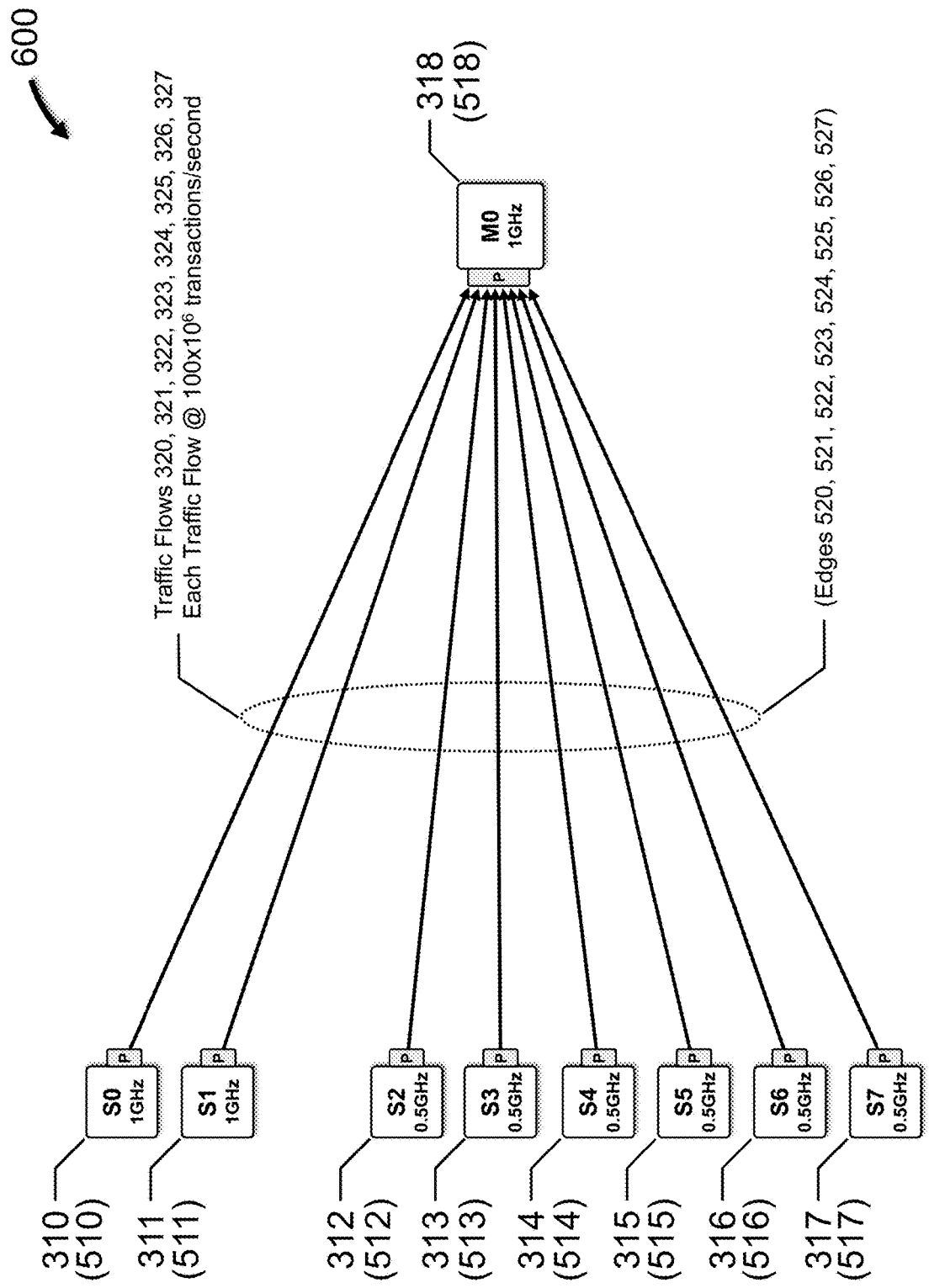
FIG. 9A depicts a traffic flow view of the traffic flows within a NoC, in accordance with an embodiment of the present disclosure.

FIG. 9A depicts traffic flow view 600 of the traffic flows within NoC 300, in accordance with an embodiment of the present disclosure.

Traffic flow view 600 presents a slightly different view of TG 500 (the nodes and edges of TG 500 are indicated parenthetically). Traffic flow view 600 depicts devices 310 to 318 and their respective bridge ports, the operating frequency of each device, traffic flow sets 320, 321, 322, 323, 324, 325, 326 and 327, and the number of transactions per second for each traffic flow.

Devices 310, 311 and 318 operate at 1 GHz, while devices 312, 313, 314, 315, 316 and 317 operate at 0.5 GHz. Accordingly, a valid clock domain for devices 310, 311 and 318 is a 1 GHz clock domain, while a valid clock domain for devices 310, 311, 312, 313, 314, 315, 316 and 317 is a 0.5 GHz clock domain. Each traffic flow set represents a single, unidirectional traffic flow of $100 \times 10^6$ transactions or packets per second from each device 310, 311, 312, 313, 314, 315, 316 and 317 to device 318.

Traffic flow sets 322, 323, 324, 325, 326 and 327 must cross a clock domain boundary because devices 312, 313, 314, 315, 316 and 317 are located in a clock domain that has a different clock speed than the clock domain in which device 318 is located. In many embodiments, traffic flow sets 320 and 321 do not cross a clock domain boundary because devices 310, 311 and 318 are located in the same clock domain. In other embodiments, traffic flow sets 320 and 321 may cross a clock domain boundary because devices 310, 311 and 318 are located in different clock domains having the same clock speed.

In many embodiments, the minimum router frequencies may be determined as follows.

For each edge in the TG, all of the source-destination (SD) end-point pairs that use that edge are identified, and all of the packet rates from the identified SD pairs are summed to generate a total packet rate for that edge. For traffic flow view 600, edges 520, 521, 522, 523, 524, 525, 526 and 527 each have a total packet rate of $100 \times 10^6$ packets/second.

All routers that have at least one output port shared by multiple input ports are then identified, and several determinations are then performed for each identified router. For each output port, $O_i$, the packet rate on all input ports that share this output port are summed to generate a total output packet rate, and the minimum frequency for this output port, $O_{i\text{-}min}$, is calculated based on the total output packet rate. The router minimum frequency, $r_{min}$, is then set to be the maximum of the minimum frequencies of all of the output ports, $O_{i\text{-}min}$. The valid CDs that satisfy $r_{min}$ are then identified, and the initial router clock domain is then assigned.

Figure 9B:
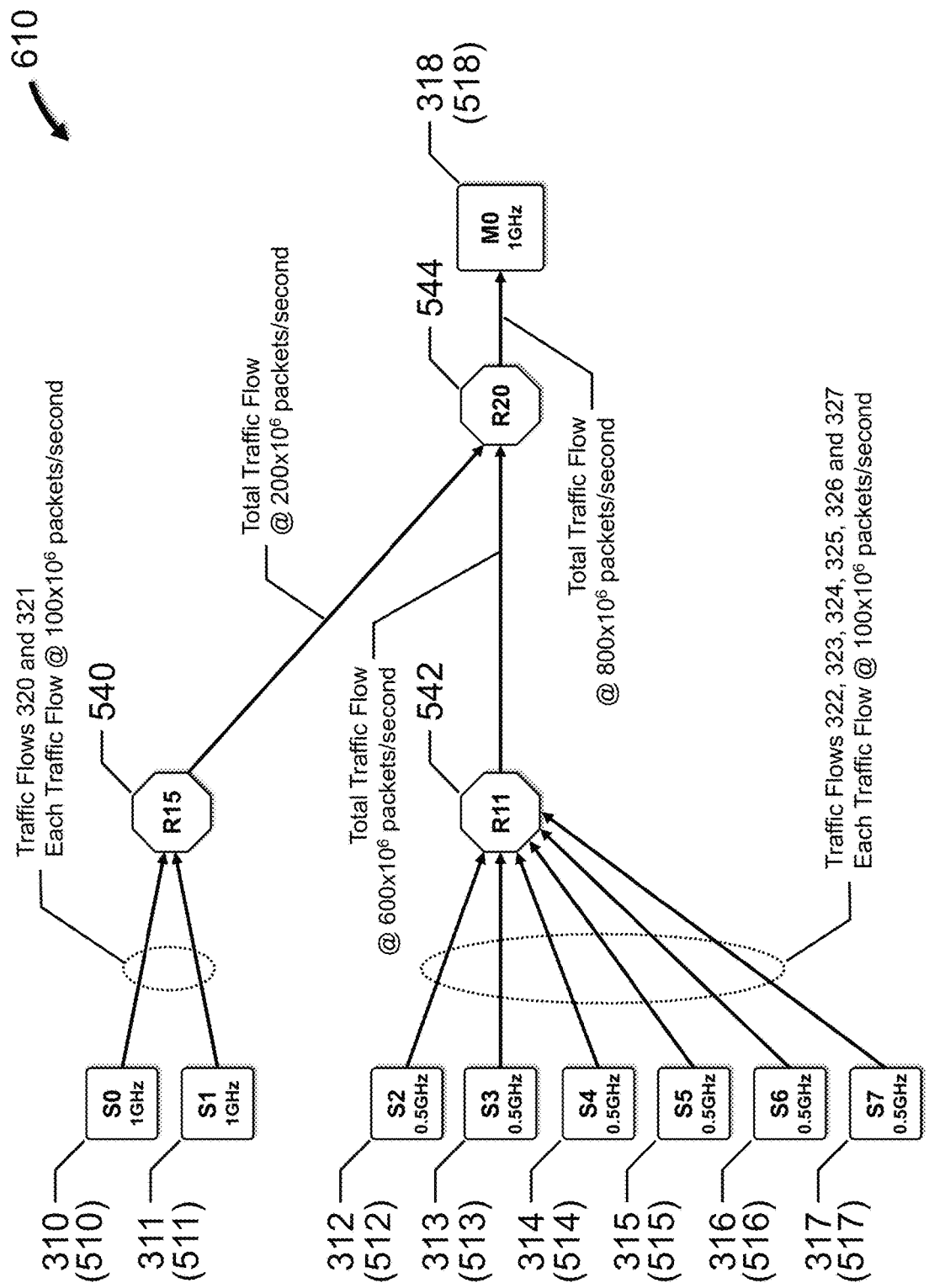
FIG. 9B depicts a traffic flow view of the traffic flows over a baseline topology of a NoC, in accordance with an embodiment of the present disclosure.

FIG. 9B depicts traffic flow view 610 of the traffic flows over baseline topology 507 of NoC 300, in accordance with an embodiment of the present disclosure.

Generally, a router may have up to 8 input ports, up to 8 output ports and may support up to 4 VCs in order to meet timing requirements. In baseline topology 507, routers 540 and 544 receive traffic on 2 input ports, and transmit traffic on 1 output port and 1 VC. Router 542 receives traffic on 6 input ports, and transmits traffic on 1 output port and 1 VC. In other words, routers 540, 542 and 544 have at least one output shared by multiple input ports.

For router 540, the sum of the packet rates on the two input ports that share the single output port is $200 \times 10^6$ packets/second. The minimum frequency for the single output port is determined to be 0.2 GHz, which is also the router minimum frequency, $r_{min}$. The valid CDs that satisfy $r_{min}$ are then identified as 0.5 GHz and 1 GHz, and an initial router clock domain of 1 GHz is then assigned, based on $r_{min}$ and the operating frequency of devices 310 and 311.

For router 542, the sum of the packet rates on the six input ports that share the single output port is $600 \times 10^6$ packets/second. The minimum frequency for the single output port is determined to be 0.6 GHz, which is also the router minimum frequency, $r_{min}$. The valid CDs that satisfy $r_{min}$ are then identified as 0.5 GHz and 1 GHz, and an initial router clock domain of 0.5 GHz is then assigned, based on $r_{min}$ and the operating frequency of devices 312, 313, 314, 315, 316 and 317.

For router 544, the sum of the packet rates on the two input ports that share the single output port is $800 \times 10^6$ packets/second. The minimum frequency for the single output port is determined to be 0.8 GHz, which is also the router minimum frequency, $r_{min}$. The valid CDs that satisfy $r_{min}$ are then identified as 0.5 GHz and 1 GHz, and an initial router clock domain of 1 GHz is then assigned, based on $r_{min}$ and the operating frequency of device 318.

Figure 10A:
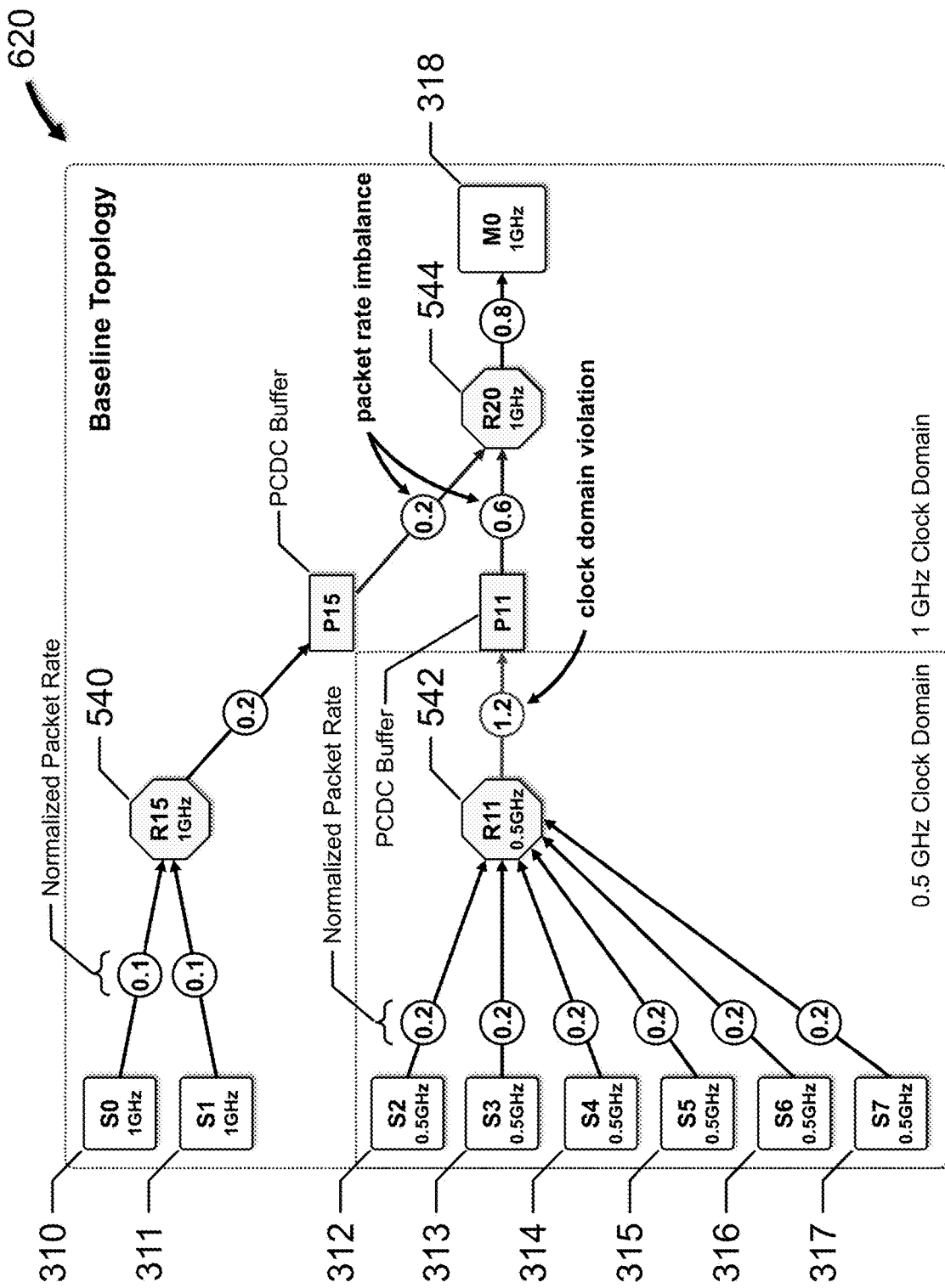
FIG. 10A depicts a traffic flow view of the traffic flows over a baseline topology of a NoC, in accordance with an embodiment of the present disclosure.

FIG. 10A depicts traffic flow view 620 of the traffic flows over baseline topology 507 of NoC 300, in accordance with an embodiment of the present disclosure.

While PCDC buffers may be added at a subsequent stage (e.g., at 270 below), in many embodiments, PCDC buffers may be added earlier to assist in the assignment and optimization of clock domains. In this embodiment, PCDC buffer P11 has been added to the 1 GHz clock domain, and is located between router 542 and router 544. PCDC buffer P15 has been added to the 1 GHz clock domain for flexibility, and is located between router 540 and router 544.

Under this initial assignment of clock domains, the normalized packet rates on the links between the devices, routers and PCDC buffers may be calculated based on the traffic flow of 100×10$^6$ transactions (or packets) per second originating from each device 310, 311, 312, 313, 314, 315, 316 and 317 and the clock domain frequencies. The normalized packet rate for a particular link may be defined as the number of transactions per second divided by the frequency of the clock domain in which the link is located. For example, the normalized packet rate on the link between device 310 and router 540 is 100×10$^6$/1×10$^9$ or 0.1 packets/cycle, the normalized packet rate on the link between device 312 and router 542 is 100×10$^6$/0.5×10$^9$ or 0.2 packets/cycle, and so on.

More particularly, router 540 receives 0.1 packets/cycle from device 310 over a first input port, receives 0.1 packets/cycle from device 311 over a second input port, and transmits 0.2 packets/cycle to PCDC buffer P15 over 1 output port and 1 VC. PCDC buffer P15 transmits 0.2 packets/cycle to router 544. These normalized packet rates are determined with respect to the 1 GHz clock domain, in which 1 cycle equals 1×10$^{-9}$ seconds.

Router 542 receives 0.2 packets/cycle from device 312 over a first input port, receives 0.2 packets/cycle from device 313 over a second input port, receives 0.2 packets/cycle from device 314 over a third input port, receives 0.2 packets/cycle from device 315 over a fourth input port, receives 0.2 packets/cycle from device 316 over a fifth input port, and receives 0.2 packets/cycle from device 317 over a sixth input port. Router 542 transmits 1.2 packets/cycle to PCDC buffer P11 over 1 output port and 1 VC. PCDC buffer P11 transmits 0.6 packets/cycle to router 544. These normalized packet rates are determined with respect to the 0.5 GHz clock domain, in which 1 cycle equals 2×10$^{-9}$ seconds.

Router 544 receives 0.2 packets/cycle from PCDC buffer P15 over a first input port, receives 0.6 packets/cycle from PCDC buffer P11 over a second input port, and transmits 0.8 packets/cycle to device 318. These normalized packet rates are determined with respect to the 1 GHz clock domain, in which 1 cycle equals 1×10$^{-9}$ seconds.

Under baseline topology 507, router 542 violates the router minimum frequency requirement, since it has been assigned an initial clock domain of 0.5 GHz but has a minimum frequency $r_{min}$ of 0.6 GHz. This results in an assignment to transmit 1.2 packets/cycle from a single output port and VC, which is greater than the maximum permissible normalized packet rate of 1 packet/cycle. This clock domain violation is indicated in FIG. 10A.

Additionally, router 542 provides a normalized packet rate of 0.6 packets/cycle to one of the input ports of router 544, which creates a packet rate imbalance when compared to the normalized packet rate of 0.2 packets/cycle provided by router 540 to another one of the input ports of router 544. This packet rate imbalance is also indicated in FIG. 10A. Advantageously, the performance cost may be used to eliminate the clock domain violation and balance the normalized packet rates on the input ports of router 544.

Generally, for each router whose assigned frequency is less than its minimum frequency, i.e., $r_{min}$, a maximum normalized packet rate difference parameter, i.e., $P_{router}$, is determined for the router. The $P_{router}$ parameters are then summed to generate the packet rate balancing cost that is used to explore additional variations of the baseline topology.

More particularly, for each output port and VC combination {port, VC} on the router, i.e., OVC, the difference between the normalized packet rates, i.e., $P_{ij}$, is calculated for each pair (or combination) of input ports {i,j} that share the OVC, and then the difference between the maximum $P_{ij}$ and the minimum $P_{ij}$ for that OVC is determined, i.e., $P_{OVC}$. The maximum $P_{OVC}$ is then determined for the router. Finally, the $P_{OVC}$ for each router are summed to generate the packet rate balancing cost.

Figure 10B:
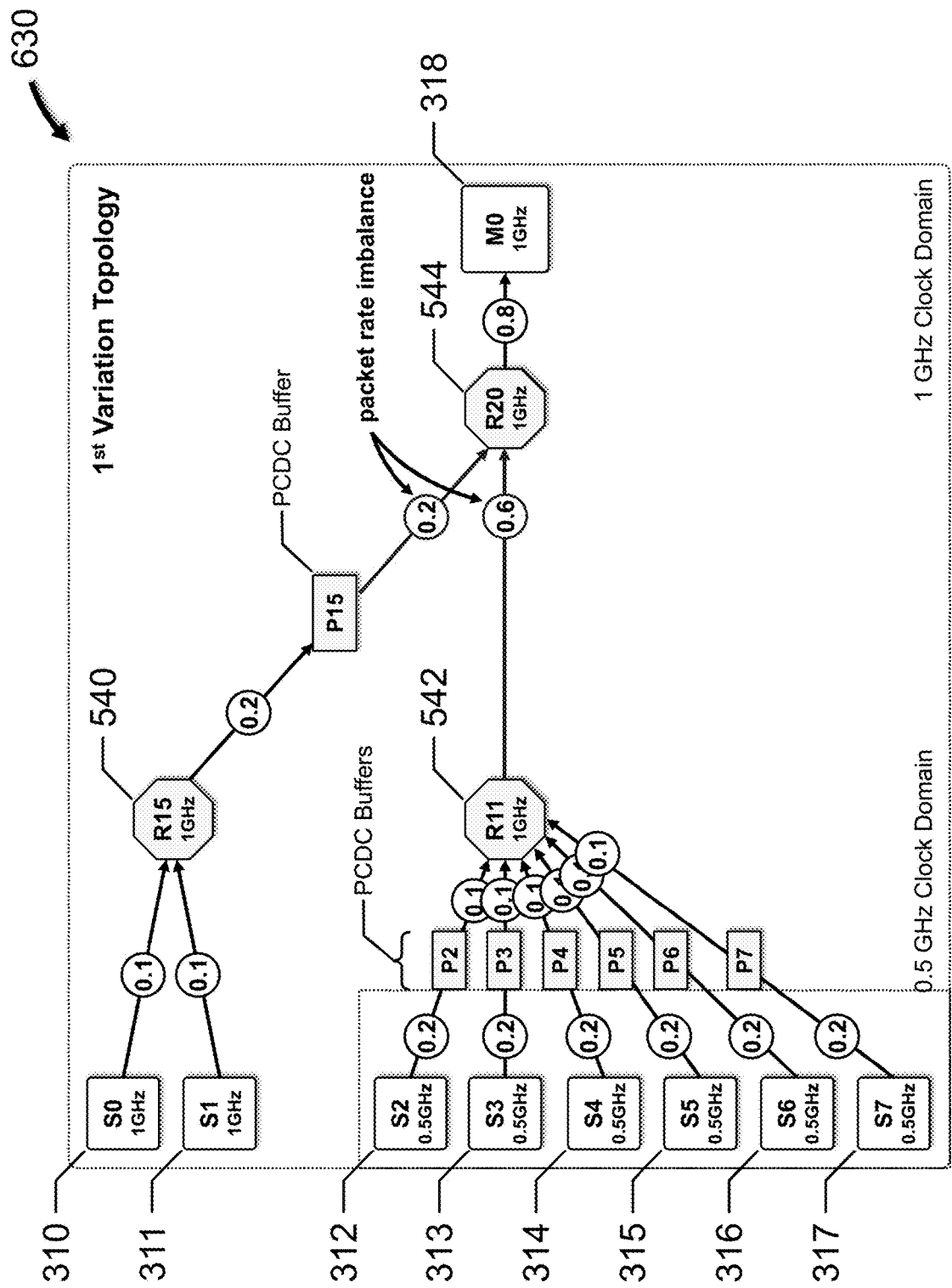
FIG. 10B depicts a traffic flow view of the traffic flows over a first variation topology of a NoC, in accordance with an embodiment of the present disclosure.

FIG. 10B depicts traffic flow view 630 of the traffic flows over a first variation topology of NoC 300, in accordance with an embodiment of the present disclosure.

In this embodiment, router 542 has been relocated to the 1 GHz clock domain, and PCDC buffers P2, P3, P4, P5, P6 and P7 have been added to the 1 GHz clock domain. PCDC buffers P2, P3, P4, P5, P6 and P7 are located between router 542 and devices 312, 313, 314, 315, 316 and 317, respectively, to address the clock domain violation.

More particularly, PCDC buffer P2 receives 0.2 packets/cycle from device 312, and transmits 0.1 packets/cycle to router 542. PCDC buffer P3 receives 0.2 packets/cycle from device 313, and transmits 0.1 packets/cycle to router 542. PCDC buffer P4 receives 0.2 packets/cycle from device 314, and transmits 0.1 packets/cycle to router 542. PCDC buffer P5 receives 0.2 packets/cycle from device 315, and transmits 0.1 packets/cycle to router 542. PCDC buffer P6 receives 0.2 packets/cycle from device 316, and transmits 0.1 packets/cycle to router 542. PCDC buffer P7 receives 0.2 packets/cycle from device 317, and transmits 0.1 packets/cycle to router 542. Router 542 transits 0.6 packets/cycle over a single output port and VC to router 544.

The traffic flows from devices 310, 311 and router 540 remain the same as baseline topology 507. More particularly, router 540 receives 0.1 packets/cycle from device 310 over a first input port, receives 0.1 packets/cycle from device 311 over a second input port, and transmits 0.2 packets/cycle to PCDC buffer P15 over 1 output port and 1 VC. PCDC buffer P15 transmits 0.2 packets/cycle to router 544. Router 544 receives 0.2 packets/cycle from PCDC buffer P15 over a first input port, receives 0.6 packets/cycle from router 542 over a second input port, and transmits 0.8 packets/cycle to device 318.

While the clock domain violation has been eliminated, the packet rate imbalance at router 544 has not been addressed, and is indicted in FIG. 10B. Additionally, the addition of six PCDC buffers to the 1 GHz clock domain may not satisfy other design requirements for the NoC, such as, for example, PPA design constraints, etc.

Figure 10C:
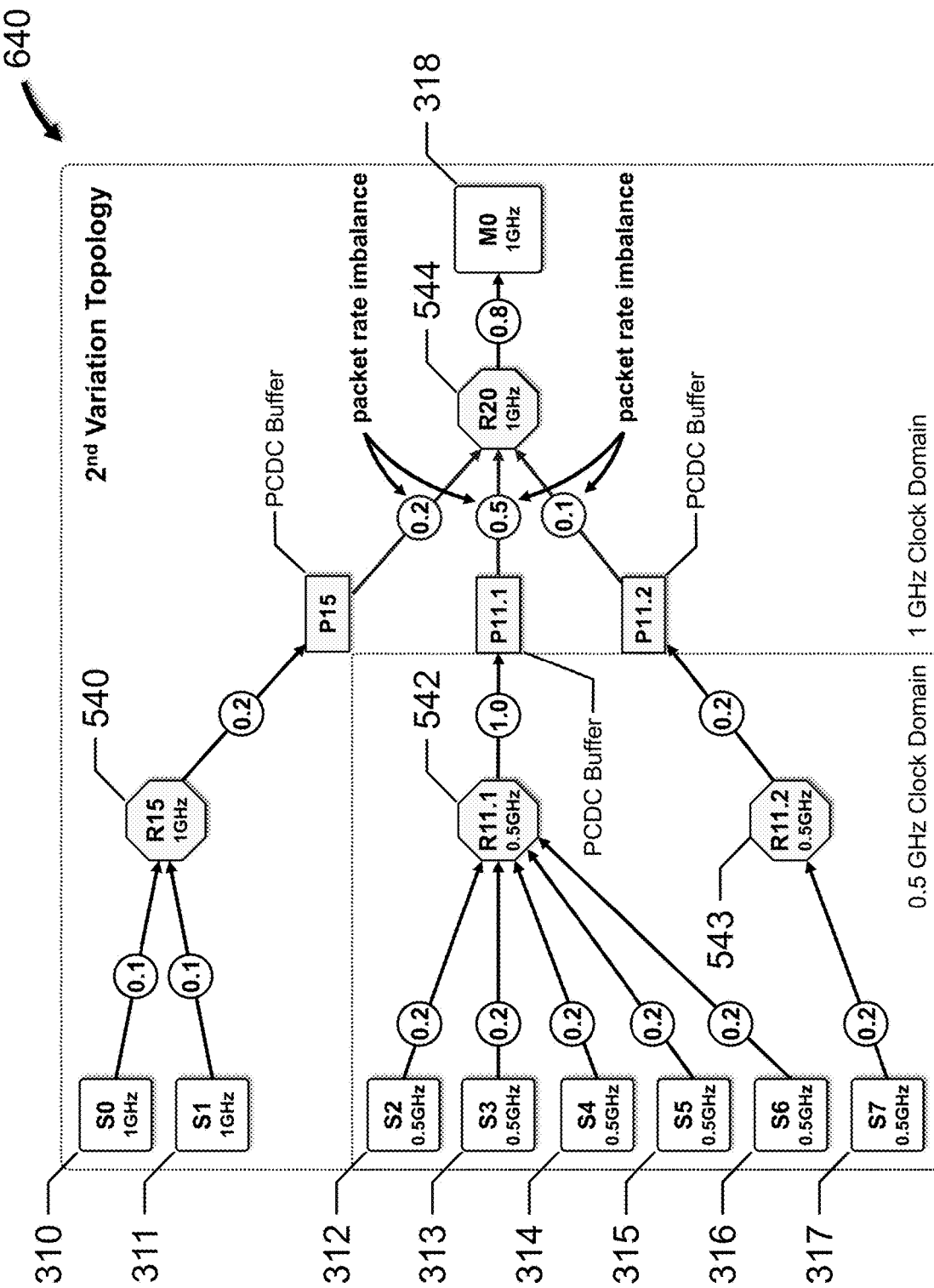
FIG. 10C depicts a traffic flow view of the traffic flows over a second variation topology of a NoC, in accordance with an embodiment of the present disclosure.

FIG. 10C depicts traffic flow view 640 of the traffic flows over a second variation topology of NoC 300, in accordance with an embodiment of the present disclosure.

In this embodiment, router 542 has been relocated to the 0.5 GHz clock and split into two routers, i.e., router 542 (R11.1) and router 543 (R11.2), to address the clock domain violation. PCDC buffers 11.1 and 11.2 have also been introduced into the 1 GHz clock domain.

Router 540 receives 0.1 packets/cycle from device 310 over a first input port, receives 0.1 packets/cycle from device 311 over a second input port, and transmits 0.2 packets/cycle to PCDC buffer P15 over 1 output port and 1 VC. PCDC buffer P15 transmits 0.2 packets/cycle to router 544.

Router 542 receives 0.2 packets/cycle from device 312 over a first input port, receives 0.2 packets/cycle from device 313 over a second input port, receives 0.2 packets/cycle from device 314 over a third input port, receives 0.2 packets/cycle from device 315 over a fourth input port, and receives 0.2 packets/cycle from device 316 over a fifth input port. Router 542 transmits 1.0 packets/cycle to PCDC buffer P11.1 over 1 output port and 1 VC. PCDC buffer P11.1 transmits 0.5 packets/cycle to router 544.

Router 543 receives 0.2 packets/cycle from device 317 over a first input port, and transmits 0.2 packets/cycle to PCDC buffer P11.2 over 1 output port and 1 VC. PCDC buffer P11.2 transmits 0.1 packets/cycle to router 544.

Router 544 receives 0.2 packets/cycle from PCDC buffer P15 over a first input port, receives 0.5 packets/cycle from router 542 over a second input port, receives 0.1 packets/cycle from router 543 over a third input port, and transmits 0.8 packets/cycle to device 318.

While the clock domain violation has been eliminated, the normalized packet rate output by router 542 is the maximum permissible normalized packet rate of 1 packet/cycle. This does not present an optimal solution, as any processing delay occurring at router 542 will produce missed packet transmissions to PCDC buffer P11.1.

Additionally, the packet rate imbalance at router 544 has not been addressed. Router 542 provides a normalized packet rate of 0.5 packets/cycle to second input port of router 544, which creates a packet rate imbalance when compared to the normalized packet rate of 0.2 packets/cycle provided by router 540 to the first input port of router 544 as well as the normalized packet rate of 0.2 packets/cycle provided by router 543 to the third input port of router 544. This packet rate imbalance is indicated in FIG. 10C.

Table 1 summarizes the normalized packet rate and the packet transmission cycle for certain links depicted in FIG. 10C. The PCDC buffer P15 to router 544 link is identified as "P15 to R20," the PCDC buffer P11.1 to router 544 link is identified as "P11.1 to R20," the PCDC buffer P11.2 to router 544 link is identified as "P11.2 to R20," and the router 542 to PCDC buffer P11.1 link is identified as "R11.1 to P11.1."

TABLE 1

| Link | Normalized Packet Rate | Packet Transmission Cycle |
| --- | --- | --- |
| P15 to R20 | 0.2 packets/cycle | 0, 5, 10, 15, 20, . . . |
| P11.1 to R20 | 0.5 packets/cycle | 0, 2, 4, 6, 8, 10, 12, 14, . . . |
| P11.2 to R20 | 0.1 packets/cycle | 0, 10, 20, . . . |
| R11.1 to P11.1 | 1.0 packets/cycle | 0, 1, 2, 3, 4, 5, . . . |

In this embodiment, arbitration at router 544 (R20) during cycles 0, 10, 20, etc. forces the packets transmitted over the P11.1 to R20 to wait for two cycles, which also causes the packets transmitted over the R11.1 to P11.1 link wait for one cycle. The performance loss on the R11.1 to P11.1 link is 20%.

Figure 10D:
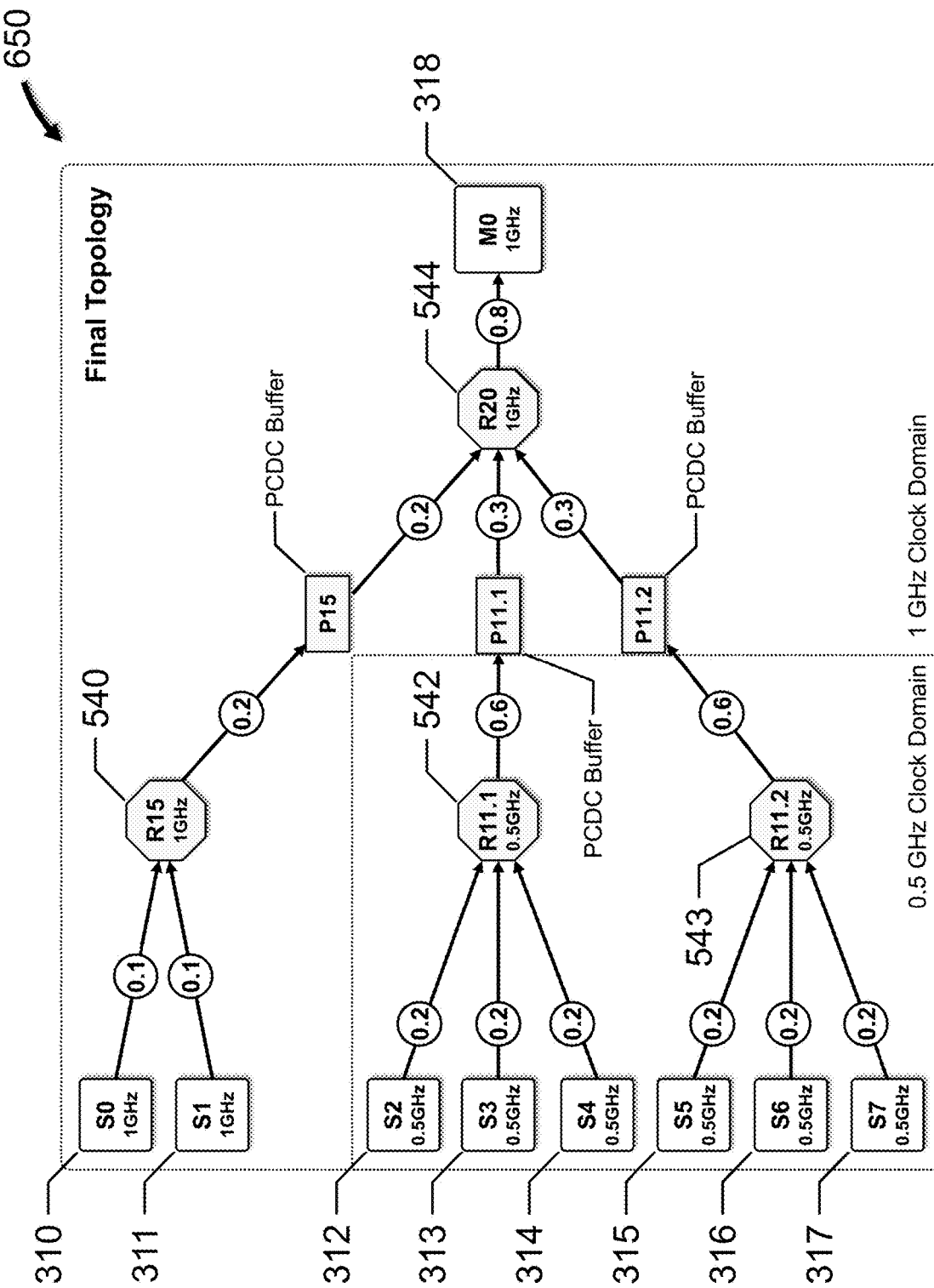
FIG. 10D depicts a traffic flow view of the traffic flows over a final topology of a NoC, in accordance with an embodiment of the present disclosure.

FIG. 10D depicts traffic flow view 650 of the traffic flows over a final topology of NoC 300, in accordance with an embodiment of the present disclosure.

In this embodiment, two traffic flows have been reassigned to router 543 from router 542, i.e., traffic flow sets 325 and 326.

Router 540 receives 0.1 packets/cycle from device 310 over a first input port, receives 0.1 packets/cycle from device 311 over a second input port, and transmits 0.2 packets/cycle to PCDC buffer P15 over 1 output port and 1 VC. PCDC buffer P15 transmits 0.2 packets/cycle to router 544.

Router 542 receives 0.2 packets/cycle from device 312 over a first input port, receives 0.2 packets/cycle from device 313 over a second input port, and receives 0.2 packets/cycle from device 314 over a third input port. Router 542 transmits 0.6 packets/cycle to PCDC buffer P11.1 over 1 output port and 1 VC. PCDC buffer P11.1 transmits 0.3 packets/cycle to router 544.

Router 543 receives 0.2 packets/cycle from device 315 over a first input port, receives 0.2 packets/cycle from device 316 over a second input port, and receives 0.2 packets/cycle from device 317 over a third input port. Router 543 transmits 0.6 packets/cycle to PCDC buffer P11.2 over 1 output port and 1 VC. PCDC buffer P11.2 transmits 0.3 packets/cycle to router 544.

Router 544 receives 0.2 packets/cycle from PCDC buffer P15 over a first input port, receives 0.3 packets/cycle from router 542 over a second input port, receives 0.3 packets/cycle from router 543 over a third input port, and transmits 0.8 packets/cycle to device 318.

Table 2 summarizes the normalized packet rate and the packet transmission cycle for certain links depicted in FIG. 10D. The PCDC buffer P15 to router 544 link is identified as "P15 to R20," the PCDC buffer P11.1 to router 544 link is identified as "P11.1 to R20," the PCDC buffer P11.2 to router 544 link is identified as "P11.2 to R20," the router 542 to PCDC buffer P11.1 link is identified as "R11.1 to P11.1," and the router 543 to PCDC buffer P11.2 link is identified as "R11.2 to P11.2."

TABLE 2

| Link | Normalized Packet Rate | Packet Transmission Cycle |
| --- | --- | --- |
| P15 to R20 | 0.2 packets/cycle | 0, 5, 10, 15, 20, . . . |
| P11.1 to R20 | 0.3 packets/cycle | 0, 3, 6, 10, 13, 16, 20, . . . |
| P11.2 to R20 | 0.3 packets/cycle | 0, 3, 6, 10, 13, 16, 20, . . . |
| R11.1 to P11.1 | 0.6 packets/cycle | 0, 2, 4, 5, 6, 8, 10, 12, 14, . . . |
| R11.2 to P11.2 | 0.6 packets/cycle | 0, 2, 4, 5, 6, 8, 10, 12, 14, . . . |

In this embodiment, arbitration at router 544 (R20) during cycles 0, 10, 20, etc. forces the packets transmitted over the P11.1 to R20 or P11.2 to R20 to wait for one cycle, but there is no cycle loss for the packets transmitted over the R11.1 to P11.1 link or the R11.2 to P11.2 link. There is no performance loss.

The final topology is a balanced NoC topology that eliminates the clock domain violation and packet rate imbalance present in baseline topology 507.

At 250, a final route for each traffic flow is determined. In one embodiment, shortest path routing is used, with optional constraints to disallow cycles in the generated topology. Different routing methodologies may be employed, such as, for example, XY-YX routing, turn prohibition routing, etc.

At 260, a configuration network is generated. In many embodiments, the configuration network may be used for debugging purposes. The configuration network includes the bridge ports, the routers, the connections and the routes. In one embodiment, the configuration network mimics the data-network. Additionally, the configuration network may be independently optimized in a manner similar to the data-network. The latency and performance of the configuration network are typically relaxed in order to produce the simplest design with the lowest area.

At 270, a PCDC buffer is added to a connection between a bridge or router in a synchronous clock domain and an adjacent bridge or router in an asynchronous clock domain, and clock domains assignments may be refined. A link size is also determined for each router in each route, and a resizer is added between a bridge and a router with different link sizes or between adjacent routers with different link sizes. Generally, link sizes are determined using bridge data, traffic data, VC assignments and topology in order to collectively meet average traffic performance requirements and to individually meet peak traffic performance requirements. Additionally, the number of resizers added to the NoC is minimized in order to reduce the latency encountered by the traffic flows. In certain embodiments, certain bridge ports may be allowed to peak concurrently.

At 280, pipeline and retiming components are added based on timing. In order to meeting timing, pipeline components are added at appropriate locations to keep the slack (i.e., the difference between a required time and an arrival time) within appropriate limits. For example, one or more components may be relocated, and, if the relocated components are not able to meet timing, then one or more pipeline components may be added. For example, component relocation may be based on force-directed placement, etc. In certain embodiments, blocks 260, 270 and 280 may be repeated until the NoC has been optimized.

At 290, NoC output specification 292 is generated, and then stored in memory 130. Additionally, NoC output specification 292 may be transmitted over network 20, provided to software modules 136 used by the NoC designer, etc. For example, NoC output specification 292 may be provided as input to a NoC fabrication process in a chip foundry. Reports 294 may also be generated, and then stored in memory 130. For example, reports 294 may contain the components used in the design (e.g., routers, resizers, PCDCs, pipelines, etc.), the traffic on each link, the link utilization, latencies across a path, etc.

Figure 11:
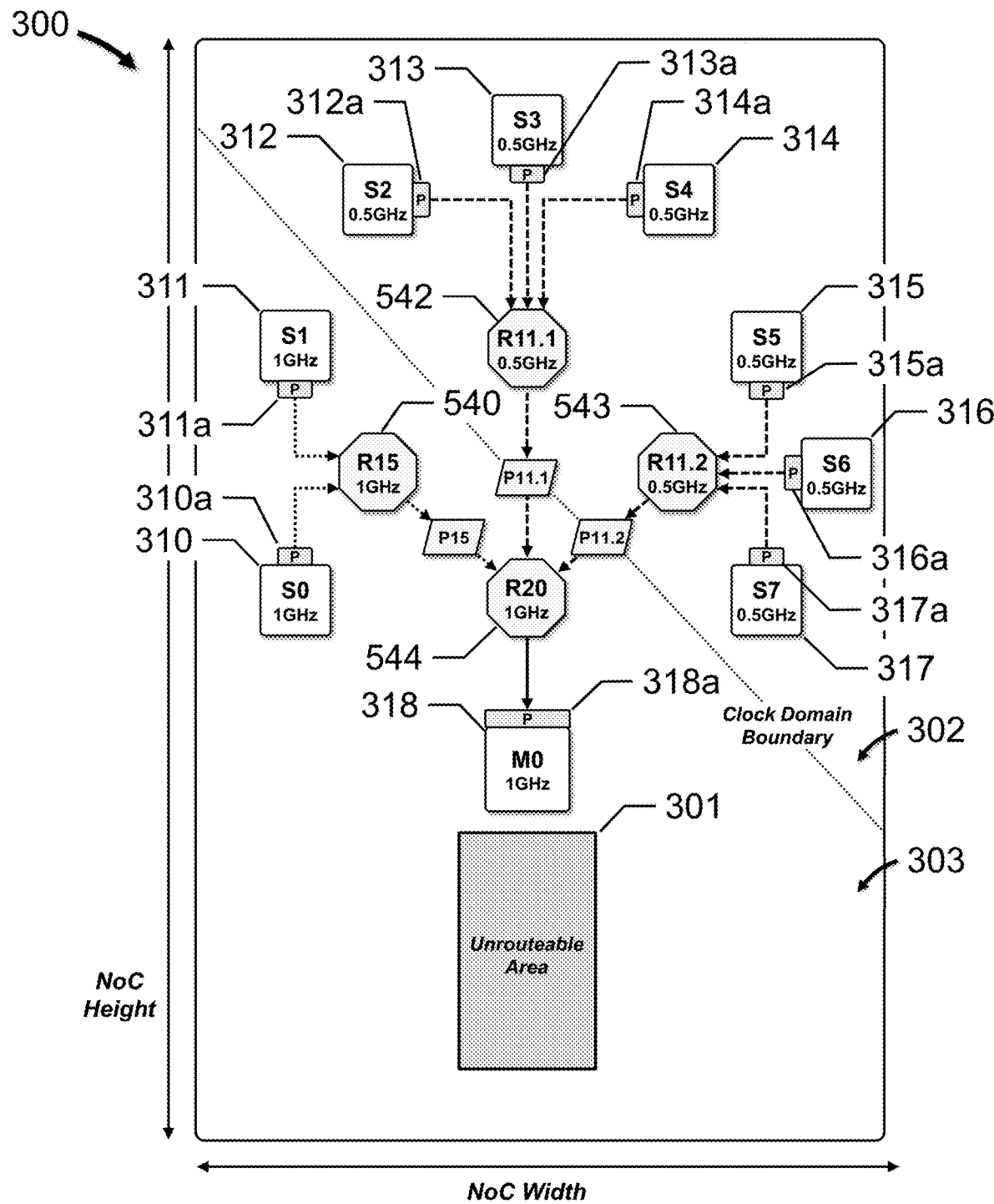
FIG. 11 depicts a final topology for a NoC, in accordance with an embodiment of the present disclosure.

FIG. 11 depicts final topology 508 for NoC 300, in accordance with an embodiment of the present disclosure. A user may view final topology 508 on display 152.

NoC 300 now includes clock domains 302 and 303. Clock domain 302 is the 0.5 GHz clock domain, while clock domain 303 is the 1 GHz clock domain.

Devices 310 and 311 are connected to router 540. Devices 312, 313 and 314 are connected to router 542. Devices 315, 316 and 317 are connected to router 543. Device 318 is connected to router 544. Router 540 is connected to router 544 through PCDC buffer P15. Router 542 is connected to router 544 through PCDC buffer P11.1. Router 543 is connected to router 544 through PCDC buffer P11.2.

Figure 12A:
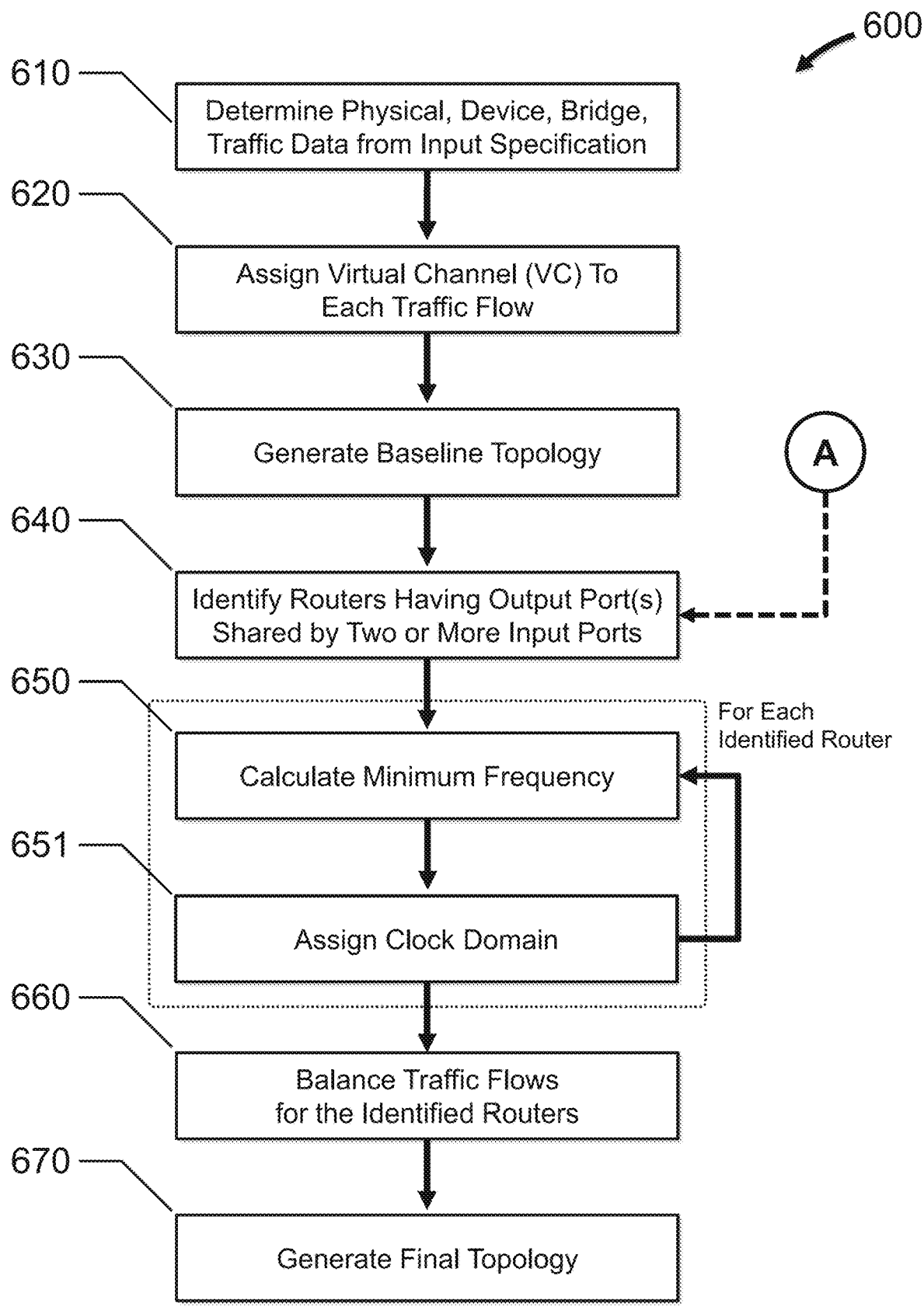
FIGS. 12A, 12B and 12C depict flow diagrams representing functionality associated with synthesizing a NoC, in accordance with embodiments of the present disclosure.
Figure 12B:
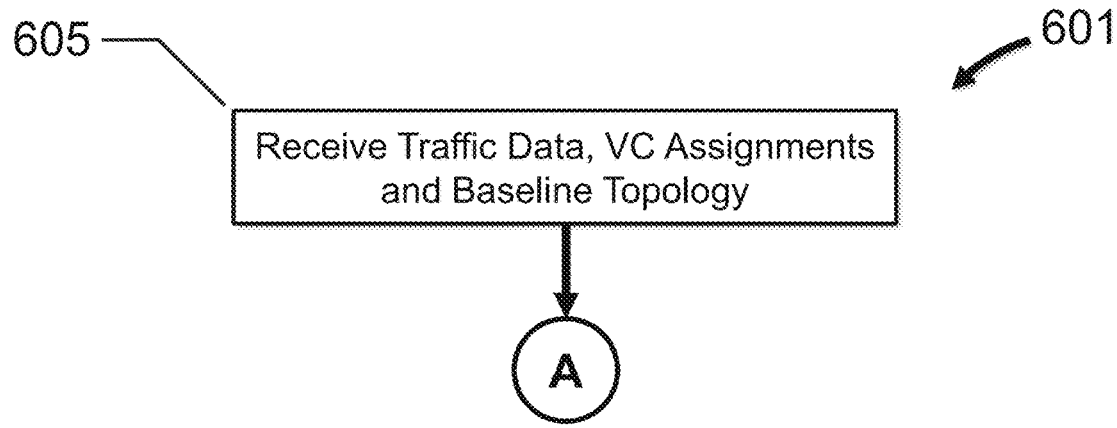
Figure 12C:
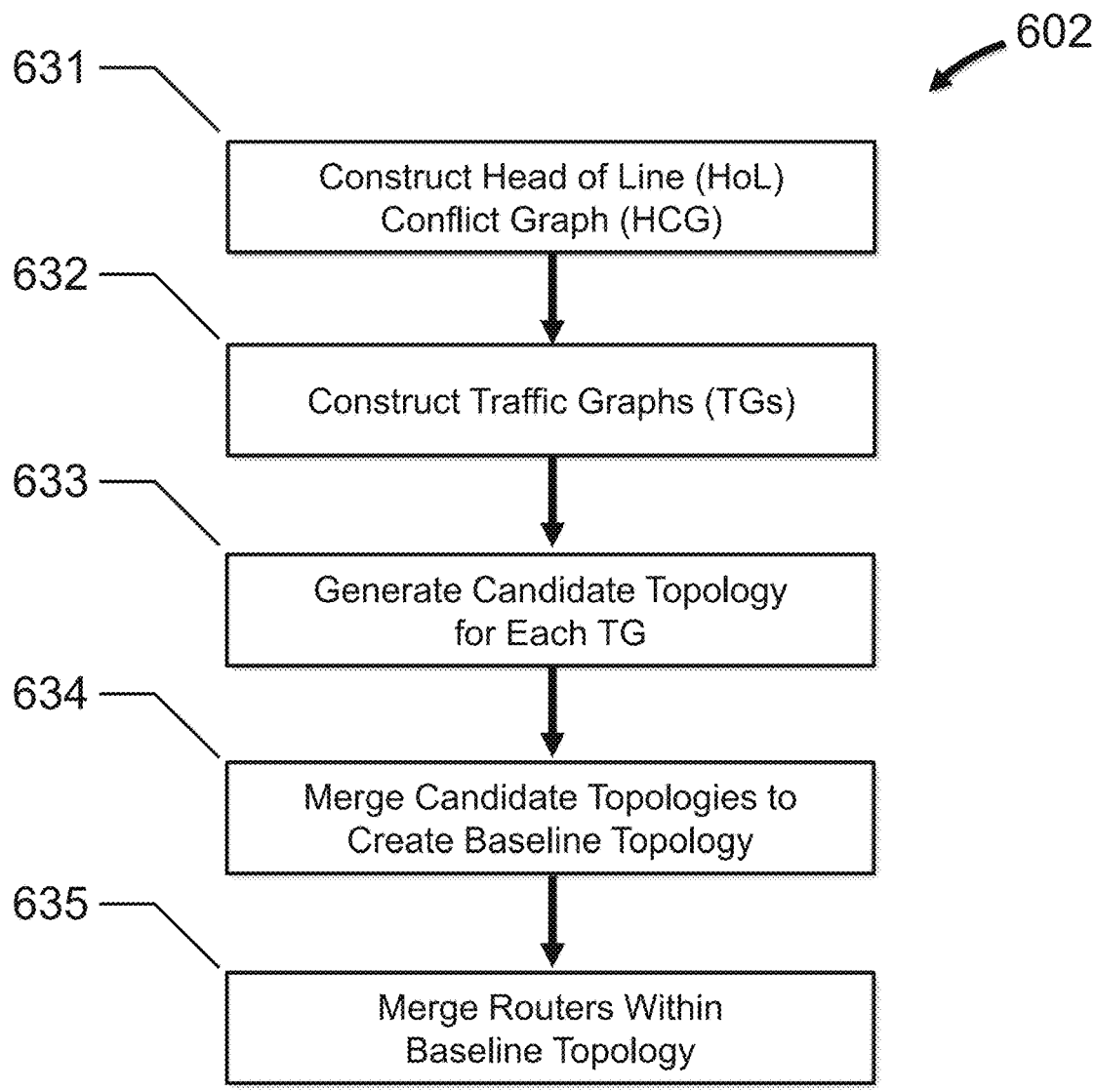

FIGS. 12A, 12B and 12C depict flow diagrams representing functionality associated with synthesizing a NoC, in accordance with embodiments of the present disclosure. FIG. 12A depicts flow diagram 600, FIG. 12B depicts flow diagram 601, and FIG. 12C depicts flow diagram 602.

At 610, physical data, device data, bridge data and traffic data are determined based on an input specification for the NoC. The physical data include dimensions for the NoC, the device data include a plurality of devices, the bridge data include a plurality of bridge ports, and the traffic data include a plurality of traffic flows. Each device has a location and dimensions, each bridge port is associated with one of the devices and has a location, and each traffic flow has a packet rate.

At 620, a virtual channel (VC) is assigned to each traffic flow to create a plurality of VC assignments.

At 630, a baseline topology is generated based on the physical data, the device data, the bridge data, the traffic data and the VC assignments. The baseline topology includes the bridge ports, routers and connections. Each router has one or more input ports and one or more output ports.

In certain embodiments, the functionality at 631 to 635 is executed to generate the baseline topology.

At 631, a head of line (HoL) conflict graph (HCG) is constructed based on the traffic data and the VC assignments, which includes creating a plurality of nodes, creating a plurality of edges, and assigning a color to each node to minimize HoL conflicts. Each node represents a traffic flow, and each edge represents an HoL conflict.

At 632, a plurality of traffic graphs (TGs) is constructed based on the physical data, the bridge data, the traffic data and the HCG, which includes constructing a TG for each color of the HCG.

At 633, a candidate topology is generated for each TG. Each candidate topology includes at least two bridge ports, at least one router and at least two connections.

At 634, the candidate topologies are merged to create the baseline topology.

At 635, the routers within the baseline topology are merged. Flow then proceeds to 640.

In other embodiments, the functionality at 610, 620 and 630 is not executed. Instead, at 605, traffic data, VC assignments and the baseline topology are received by computer 100, or, alternatively, retrieved from memory 130, and flow then proceeds to 640.

At 640, each router that has at least one output port that is shared by traffic flows that are received on at least two input ports is identified.

The functionality at 650 and 651 is repeated for each identified router.

At 650, a minimum frequency for the identified router is calculated based on the packet rates of the traffic flows received by the identified router.

At 651, a clock domain is assigned to the identified router based on the minimum frequency for the identified router.

At 660, the traffic flows received by the identified routers are balanced based on the packet rates of the traffic flows.

At 670, a final topology is generated based on the baseline topology and the balanced traffic flows for the identified routers.

Embodiments of the present disclosure advantageously provide a computer-based method and system for synthesizing a Network-on-Chip (NoC). The embodiments described above and summarized below are combinable.

In one embodiment, a computer-based method for synthesizing a NoC is provided. Physical data, device data, bridge data and traffic data are determined based on an input specification for the NoC, the physical data including dimensions for the NoC, the device data including a plurality of devices, each device having a location and dimensions, the bridge data including a plurality of bridge ports, each bridge port being associated with one of the devices and having a location, the traffic data including a plurality of traffic flows, each traffic flow having a packet rate. A virtual channel (VC) is assigned to each traffic flow to create a plurality of VC assignments. A baseline topology is generated based on the physical data, the device data, the bridge data, the traffic data and the VC assignments, the baseline topology including the plurality of bridge ports, a plurality of routers and a plurality of connections, each router having one or more input ports and one or more output ports. Each router that has at least one output port that is shared by traffic flows that are received on at least two input ports is identified. For each identified router, a minimum frequency for the identified router is calculated based on the packet rates of the traffic flows received by the identified router, and a clock domain is assigned to the identified router based on the minimum frequency for the identified router. The traffic flows received by the identified routers are balanced based on the packet rates of the traffic flows. A final topology is generated based on the baseline topology and the balanced traffic flows for the identified routers.

In another embodiment of the method, each output port that is shared transmits the traffic flows over a single VC.

In another embodiment of the method, said calculating a minimum frequency for the identified router includes for each output port: summing the packet rates of the traffic flows received on the input ports that share the output port to generate a total output packet rate, and calculating a minimum frequency for the output port based on the total output packet rate; determining a maximum frequency of the minimum frequencies of the output ports; and setting the minimum frequency for the identified router to the maximum frequency.

In another embodiment of the method, the method further includes adding a physical clock domain crossing (PCDC) buffer to each link between two routers that are assigned to different clock domains; determining normalized packet rates for the traffic flows between the bridge ports, routers and PCDC buffers based on the assigned clock domains; and identifying clock domain violations for the identified routers based on the assigned clock domains and the normalized packet rates.

In another embodiment of the method, balancing the traffic flows includes identifying packet rate imbalances for the identified routers based on the normalized packet rates; determining a performance cost based on the assigned clock domains and the normalized packet rates; and correcting the clock domain violations and the packet rate imbalances based on the performance cost.

In another embodiment of the method, the performance cost includes a router clock domain violation cost and a packet rate balancing cost.

In another embodiment of the method, correcting the clock domain violations and the packet rate imbalances includes at least one of assigning a different clock domain to one or more identified routers; routing one or more traffic flows to a different identified router; and adding one or more identified routers.

In another embodiment of the method, generating a baseline topology includes constructing a head of line (HoL) conflict graph (HCG) based on the traffic data and the VC assignments, including creating a plurality of nodes, each node representing a traffic flow, creating a plurality of edges, each edge representing an HoL conflict, and assigning a color to each HCG node to minimize HoL conflicts; constructing a plurality of traffic graphs (TGs) based on the physical data, the bridge data, the traffic data and the HCG, including constructing a TG for each color of the HCG; generating a candidate topology for each TG, each candidate topology including at least two bridge ports, at least one router and at least two connections; merging the candidate topologies to create the baseline topology; and merging routers within the baseline topology.

In one embodiment, a system for synthesizing a NoC includes a memory to store an input specification for the NoC, and a processor coupled to the memory. The processor is configured to determine physical data, device data, bridge data and traffic data based on an input specification for the NoC, the physical data including dimensions for the NoC, the device data including a plurality of devices, each device having a location and dimensions, the bridge data including a plurality of bridge ports, each bridge port being associated with one of the devices and having a location, the traffic data including a plurality of traffic flows, each traffic flow having a packet rate; assign a virtual channel (VC) to each traffic flow to create a plurality of VC assignments; generate a baseline topology based on the physical data, the device data, the bridge data, the traffic data and the VC assignments, the baseline topology including the plurality of bridge ports, a plurality of routers and a plurality of connections, each router having one or more input ports and one or more output ports; identify each router that has at least one output port that is shared by traffic flows that are received on at least two input ports; for each identified router: calculate a minimum frequency for the identified router based on the packet rates of the traffic flows received by the identified router, and assign a clock domain to the identified router based on the minimum frequency for the identified router; balance the traffic flows received by the identified routers based on the packet rates of the traffic flows; and generate a final topology based on the baseline topology and the balanced traffic flows for the identified routers.

In another embodiment of the system, each output port that is shared transmits the traffic flows over a single VC.

In another embodiment of the system, calculate a minimum frequency for the identified router includes for each output port: sum the packet rates of the traffic flows received on the input ports that share the output port to generate a total output packet rate, and calculate a minimum frequency for the output port based on the total output packet rate; determine a maximum frequency of the minimum frequencies of the output ports; and set the minimum frequency for the identified router to the maximum frequency.

In another embodiment of the system, the processor is further configured to add a physical clock domain crossing (PCDC) buffer to each link between two routers that are assigned to different clock domains; determine normalized packet rates for the traffic flows between the bridge ports, routers and PCDC buffers based on the assigned clock domains; and identify clock domain violations for the identified routers based on the assigned clock domains and the normalized packet rates.

In another embodiment of the system, balance the traffic flows includes identify packet rate imbalances for the identified routers based on the normalized packet rates; determine a performance cost based on the assigned clock domains and the normalized packet rates; and correct the clock domain violations and the packet rate imbalances based on the performance cost.

In another embodiment of the system, the performance cost includes a router clock domain violation cost and a packet rate balancing cost.

In another embodiment of the system, correct the clock domain violations and the packet rate imbalances includes at least one of assign a different clock domain to one or more identified routers; route one or more traffic flows to a different identified router; and add one or more identified routers.

In another embodiment of the system, generate a baseline topology includes construct a head of line (HoL) conflict graph (HCG) based on the traffic data and the VC assignments, including create a plurality of nodes, each node representing a traffic flow, create a plurality of edges, each edge representing an HoL conflict, and assign a color to each HCG node to minimize HoL conflicts; construct a plurality of traffic graphs (TGs) based on the physical data, the bridge data, the traffic data and the HCG, including constructing a TG for each color of the HCG; generate a candidate topology for each TG, each candidate topology including at least two bridge ports, at least one router and at least two connections; merge the candidate topologies to create the baseline topology; and merge routers within the baseline topology.

In one embodiment, a further method for synthesizing a NoC is provided. Traffic data, virtual channel (VC) assignments and a baseline topology are received, the traffic data including a plurality of traffic flows, the baseline topology including a plurality of bridge ports, a plurality of routers and a plurality of connections, each router having one or more input ports and one or more output ports, each traffic flow having a packet rate. Each router that has at least one output port that is shared by traffic flows that are received on at least two input ports is identified. For each identified router: a minimum frequency for the identified router is calculated based on the packet rates of the traffic flows received by the identified router, and a clock domain is assigned to the identified router based on the minimum frequency for the identified router. The traffic flows received by the identified routers are balanced based on the packet rates of the traffic flows. A final topology is generated based on the baseline topology and the balanced traffic flows for the identified routers.

In another embodiment of the further method, each output port that is shared transmits the traffic flows over a single VC, and said calculating a minimum frequency for the identified router includes for each output port: summing the packet rates of the traffic flows received on the input ports that share the output port to generate a total output packet rate, and calculating a minimum frequency for the output port based on the total output packet rate; determining a maximum frequency of the minimum frequencies of the output ports; and setting the minimum frequency for the identified router to the maximum frequency.

In another embodiment of the further method, the further method further includes adding a physical clock domain crossing (PCDC) buffer to each link between two routers that are assigned to different clock domains; determining normalized packet rates for the traffic flows between the bridge ports, routers and PCDC buffers based on the assigned clock domains; and identifying clock domain violations for the identified routers based on the assigned clock domains and the normalized packet rates, where said balancing the traffic flows includes: identifying packet rate imbalances for the identified routers based on the normalized packet rates, determining a performance cost based on the assigned clock domains and the normalized packet rates, the performance cost including a router clock domain violation cost and a packet rate balancing cost, and correcting the clock domain violations and the packet rate imbalances based on the performance cost.

In another embodiment of the further method, correcting the clock domain violations and the packet rate imbalances includes at least one of assigning a different clock domain to one or more identified routers; routing one or more traffic flows to a different identified router; and adding one or more identified routers.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A computer-based method for synthesizing a Network-on-Chip (NoC), comprising:
    determining physical data, device data, bridge data and traffic data based on an input specification for the NoC, the physical data including dimensions for the NoC, the device data including a plurality of devices, each device having a location and dimensions, the bridge data including a plurality of bridge ports, each bridge port being associated with one of the devices and having a location, the traffic data including a plurality of traffic flows, each traffic flow having a packet rate;
    assigning a virtual channel (VC) to each traffic flow to create a plurality of VC assignments;
    generating a baseline topology based on the physical data, the device data, the bridge data, the traffic data and the VC assignments, the baseline topology including the plurality of bridge ports, a plurality of routers and a plurality of connections, each router having one or more input ports and one or more output ports;
    identifying each router that has at least one output port that is shared by traffic flows that are received on at least two input ports;
    for each identified router:
        calculating a minimum frequency for the identified router based on the packet rates of the traffic flows received by the identified router, and
        assigning a clock domain to the identified router based on the minimum frequency for the identified router;
    balancing the traffic flows received by the identified routers based on the packet rates of the traffic flows; and
    generating a final topology based on the baseline topology and the balanced traffic flows for the identified routers.

2. The computer-based method according to claim 1, where each output port that is shared transmits the traffic flows over a single VC.

3. The computer-based method according to claim 2, where said calculating a minimum frequency for the identified router includes:
    for each output port:
        summing the packet rates of the traffic flows received on the input ports that share the output port to generate a total output packet rate, and
        calculating a minimum frequency for the output port based on the total output packet rate;
    determining a maximum frequency of the minimum frequencies of the output ports; and
    setting the minimum frequency for the identified router to the maximum frequency.

4. The computer-based method according to claim 3, further comprising:
    adding a physical clock domain crossing (PCDC) buffer to each link between two routers that are assigned to different clock domains;
    determining normalized packet rates for the traffic flows between the bridge ports, routers and PCDC buffers based on the assigned clock domains; and
    identifying clock domain violations for the identified routers based on the assigned clock domains and the normalized packet rates.

5. The computer-based method according to claim 4, where said balancing the traffic flows includes:
    identifying packet rate imbalances for the identified routers based on the normalized packet rates;
    determining a performance cost based on the assigned clock domains and the normalized packet rates; and
    correcting the clock domain violations and the packet rate imbalances based on the performance cost.

6. The computer-based method according to claim 5, where the performance cost includes a router clock domain violation cost and a packet rate balancing cost.

7. The computer-based method according to claim 6, where said correcting the clock domain violations and the packet rate imbalances includes at least one of:
    assigning a different clock domain to one or more identified routers;
    routing one or more traffic flows to a different identified router; and
    adding one or more identified routers.

8. The computer-based method according to claim 1, where said generating a baseline topology includes:
    constructing a head of line (HoL) conflict graph (HCG) based on the traffic data and the VC assignments, including:
        creating a plurality of nodes, each node representing a traffic flow,
        creating a plurality of edges, each edge representing an HoL conflict, and
        assigning a color to each HCG node to minimize HoL conflicts;
    constructing a plurality of traffic graphs (TGs) based on the physical data, the bridge data, the traffic data and the HCG, including constructing a TG for each color of the HCG;
    generating a candidate topology for each TG, each candidate topology including at least two bridge ports, at least one router and at least two connections;
    merging the candidate topologies to create the baseline topology; and
    merging routers within the baseline topology.

9. A system for synthesizing a Network-on-Chip (NoC), comprising:
    a memory to store an input specification for a NoC; and
    a processor, coupled to the memory, configured to:
        determine physical data, device data, bridge data and traffic data based on an input specification for the NoC, the physical data including dimensions for the NoC, the device data including a plurality of devices, each device having a location and dimensions, the bridge data including a plurality of bridge ports, each bridge port being associated with one of the devices and having a location, the traffic data including a plurality of traffic flows, each traffic flow having a packet rate, assign a virtual channel (VC) to each traffic flow to create a plurality of VC assignments, generate a baseline topology based on the physical data, the device data, the bridge data, the traffic data and the VC assignments, the baseline topology including the plurality of bridge ports, a plurality of routers and a plurality of connections, each router having one or more input ports and one or more output ports, identify each router that has at least one output port that is shared by traffic flows that are received on at least two input ports, for each identified router:
calculate a minimum frequency for the identified router based on the packet rates of the traffic flows received by the identified router, and
assign a clock domain to the identified router based on the minimum frequency for the identified router, balance the traffic flows received by the identified routers based on the packet rates of the traffic flows, and generate a final topology based on the baseline topology and the balanced traffic flows for the identified routers.

10. The system according to claim 9, where each output port that is shared transmits the traffic flows over a single VC.

11. The system according to claim 10, where said calculate a minimum frequency for the identified router includes:
for each output port:
sum the packet rates of the traffic flows received on the input ports that share the output port to generate a total output packet rate, and
calculate a minimum frequency for the output port based on the total output packet rate;
determine a maximum frequency of the minimum frequencies of the output ports; and
set the minimum frequency for the identified router to the maximum frequency.

12. The system according to claim 11, where the processor is further configured to:
add a physical clock domain crossing (PCDC) buffer to each link between two routers that are assigned to different clock domains;
determine normalized packet rates for the traffic flows between the bridge ports, routers and PCDC buffers based on the assigned clock domains; and
identify clock domain violations for the identified routers based on the assigned clock domains and the normalized packet rates.

13. The system according to claim 12, where said balance the traffic flows includes:
identify packet rate imbalances for the identified routers based on the normalized packet rates;
determine a performance cost based on the assigned clock domains and the normalized packet rates; and
correct the clock domain violations and the packet rate imbalances based on the performance cost.

14. The system according to claim 13, where the performance cost includes a router clock domain violation cost and a packet rate balancing cost.

15. The system according to claim 14, where said correct the clock domain violations and the packet rate imbalances includes at least one of:
assign a different clock domain to one or more identified routers;

route one or more traffic flows to a different identified router; and
add one or more identified routers.

16. The system according to claim 9, where said generate a baseline topology includes:
construct a head of line (HoL) conflict graph (HCG) based on the traffic data and the VC assignments, including:
create a plurality of nodes, each node representing a traffic flow,
create a plurality of edges, each edge representing an HoL conflict, and
assign a color to each HCG node to minimize HoL conflicts;
construct a plurality of traffic graphs (TGs) based on the physical data, the bridge data, the traffic data and the HCG, including constructing a TG for each color of the HCG;
generate a candidate topology for each TG, each candidate topology including at least two bridge ports, at least one router and at least two connections;
merge the candidate topologies to create the baseline topology; and
merge routers within the baseline topology.

17. A computer-based method for synthesizing a Network-on-Chip (NoC), comprising:
receiving traffic data, virtual channel (VC) assignments and a baseline topology, the traffic data including a plurality of traffic flows, the baseline topology including a plurality of bridge ports, a plurality of routers and a plurality of connections, each router having one or more input ports and one or more output ports, each traffic flow having a packet rate;
identifying each router that has at least one output port that is shared by traffic flows that are received on at least two input ports;
for each identified router:
calculating a minimum frequency for the identified router based on the packet rates of the traffic flows received by the identified router, and
assigning a clock domain to the identified router based on the minimum frequency for the identified router;
balancing the traffic flows received by the identified routers based on the packet rates of the traffic flows; and
generating a final topology based on the baseline topology and the balanced traffic flows for the identified routers.

18. The computer-based method according to claim 17, where each output port that is shared transmits the traffic flows over a single VC, and said calculating a minimum frequency for the identified router includes:
for each output port:
summing the packet rates of the traffic flows received on the input ports that share the output port to generate a total output packet rate, and
calculating a minimum frequency for the output port based on the total output packet rate;
determining a maximum frequency of the minimum frequencies of the output ports; and
setting the minimum frequency for the identified router to the maximum frequency.

19. The computer-based method according to claim 18, further comprising:
adding a physical clock domain crossing (PCDC) buffer to each link between two routers that are assigned to different clock domains;

determining normalized packet rates for the traffic flows between the bridge ports, routers and PCDC buffers based on the assigned clock domains; and identifying clock domain violations for the identified routers based on the assigned clock domains and the normalized packet rates, where said balancing the traffic flows includes:

identifying packet rate imbalances for the identified routers based on the normalized packet rates, determining a performance cost based on the assigned clock domains and the normalized packet rates, the performance cost including a router clock domain violation cost and a packet rate balancing cost, and correcting the clock domain violations and the packet rate imbalances based on the performance cost.

20. The computer-based method according to claim 19, where said correcting the clock domain violations and the packet rate imbalances includes at least one of:

assigning a different clock domain to one or more identified routers;

routing one or more traffic flows to a different identified router; and adding one or more identified routers.

* * * * *